US006307956B1

United States Patent
Black

(10) Patent No.: US 6,307,956 B1
(45) Date of Patent: Oct. 23, 2001

(54) WRITING IMPLEMENT FOR IDENTITY VERIFICATION SYSTEM

(75) Inventor: Gerald R. Black, 30590 Southfield Rd #160, Southfield, MI (US) 48076

(73) Assignee: Gerald R. Black, Southfield, MI (US)

(*) Notice: Subject to any disclaimer, the term of this patent is extended or adjusted under 35 U.S.C. 154(b) by 0 days.

(21) Appl. No.: 09/490,687

(22) Filed: Jan. 24, 2000

Related U.S. Application Data

(60) Provisional application No. 60/163,433, filed on Nov. 3, 1999, provisional application No. 60/154,590, filed on Sep. 17, 1999, provisional application No. 60/144,028, filed on Jul. 16, 1999, provisional application No. 60/119,408, filed on Feb. 10, 1999, provisional application No. 60/116,212, filed on Jan. 19, 1999, provisional application No. 60/114,632, filed on Jan. 4, 1999, provisional application No. 60/109,511, filed on Nov. 23, 1998, provisional application No. 60/088,498, filed on Jun. 8, 1998, and provisional application No. 60/080,962, filed on Apr. 7, 1998.

(51) Int. Cl.$^7$ ................................ G06K 9/00; H04K 1/00
(52) U.S. Cl. ........................................ 382/124; 713/186
(58) Field of Search .................. 382/115–116, 119–125; 705/64–65, 67, 16, 18; 713/186; 235/379, 380, 382; 356/71; 402/3–5, 20, 26; 345/179, 156; 178/18.01, 19.01, 19.05; 250/208.1, 216

(56) References Cited

U.S. PATENT DOCUMENTS

| | | | | |
|---|---|---|---|---|
| 5,103,486 | * | 4/1992 | Grippi | 382/124 |
| 5,247,137 | * | 9/1993 | Epperson | 178/18 |
| 5,774,571 | * | 6/1998 | Marshall | 382/119 |
| 5,838,306 | * | 11/1998 | O'Connor et al. | 345/163 |
| 5,859,420 | * | 1/1999 | Borza | 250/208.1 |
| 5,991,431 | * | 11/1999 | Borza et al. | 382/127 |

\* cited by examiner

*Primary Examiner*—Jose L. Couso
*Assistant Examiner*—Duy M. Dang
(74) *Attorney, Agent, or Firm*—Gerald R. Black

(57) ABSTRACT

The identity verification system employs biometric technology for identity verification. Positioned at the center of the system is a stylus with any of a number of biometric properties or their combination or with one or more metric sensors, while the customer uses the stylus to sign his/her name, or even for writing anything. The identity verification system is used at point-of-sale terminals, in various closed environments, to access a computer network, in applications involving pen-based computers and smart-pens, and for e-commerce. When fingerprint sensors are used, the sensors are positioned in the stylus grip, one sensor for the index finger, and a second sensor for the thumb. In one variation, one-to-one biometric matching is used. Each participant carries on his/her person a device that includes an encrypted biometric for reference purposes to gain access into the system. Processing is simplified since the system need only make a "MATCH" or "NO MATCH" decision. In a second variation that is particularly useful in closed environments, one-to-many biometric matching is used. During each event access request, the community of reference prints is searched for a match with the applicant. Each member of the community need carry nothing on his/her person to participate in the system. In either variation, the stylus is either attached to each site or is portable, one such stylus being carried by each participant.

8 Claims, 18 Drawing Sheets

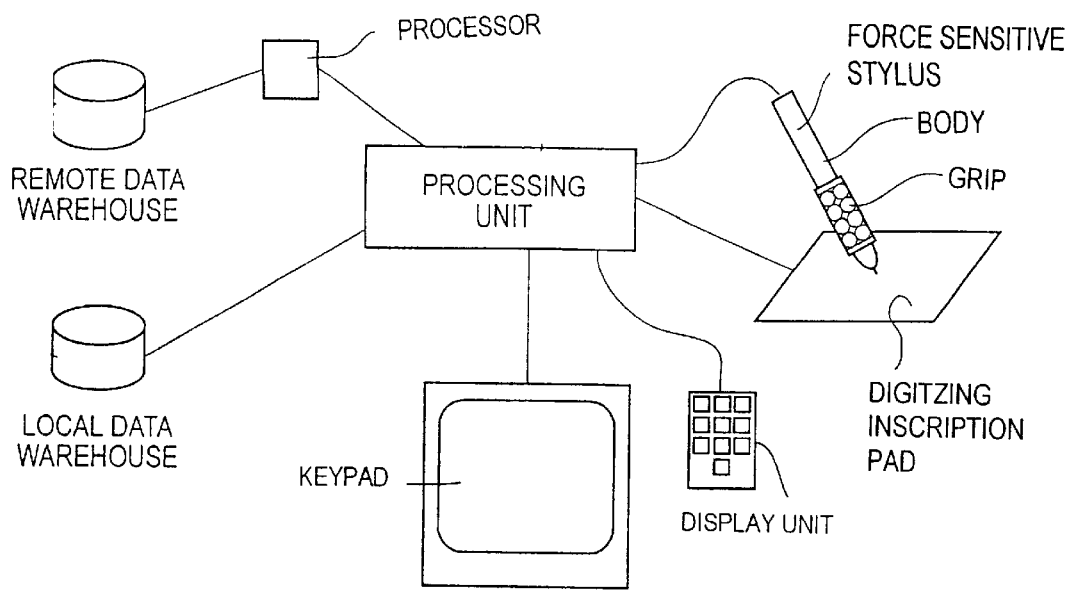
FIGURE 1B
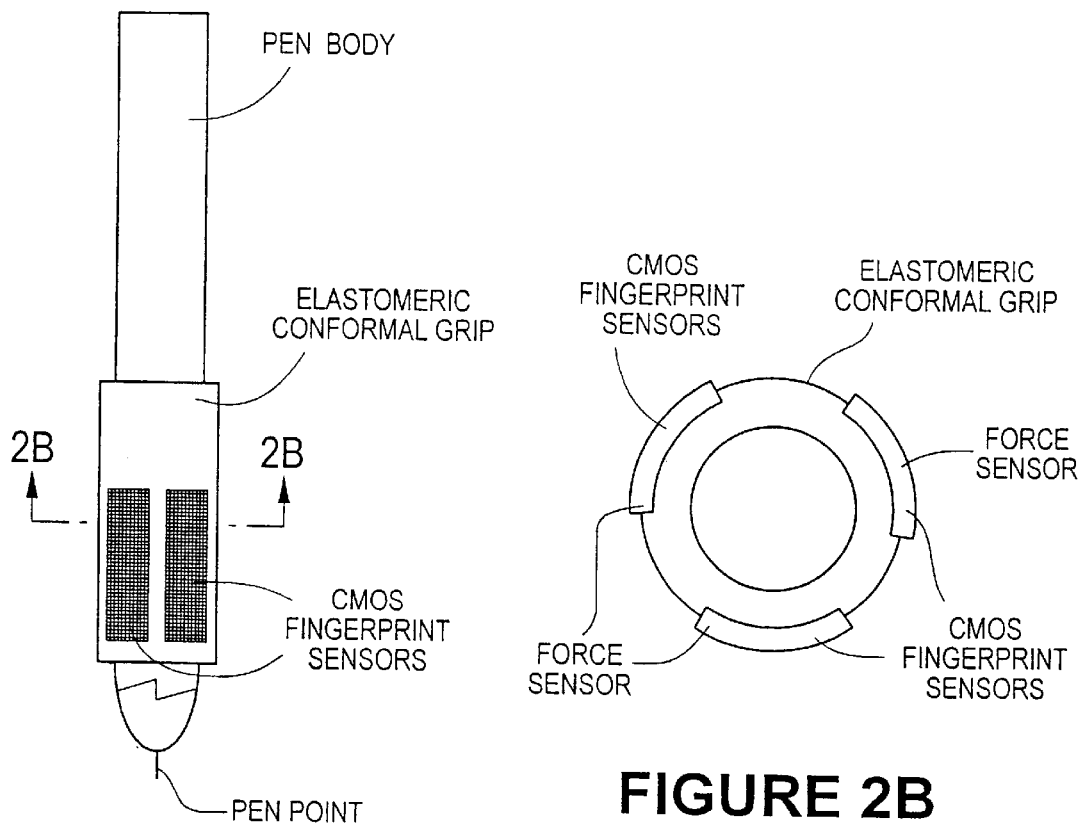
FIGURE 2A
FIGURE 2B

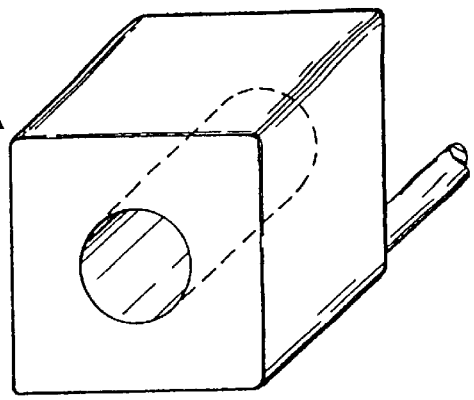
FIGURE 5A
FIGURE 5B
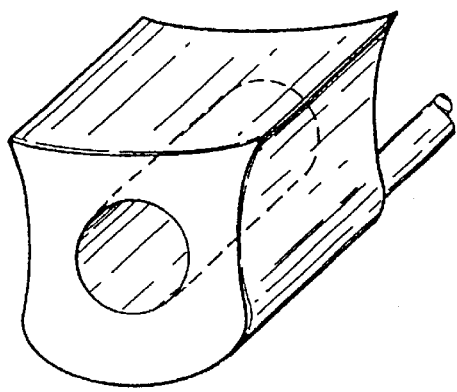
FIGURE 5C
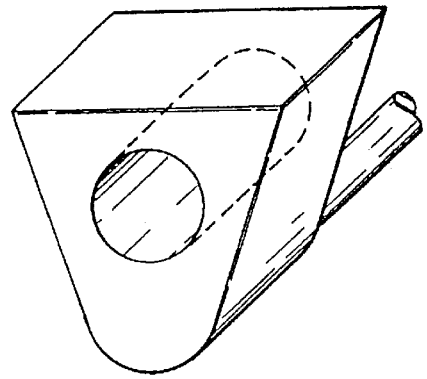
FIGURE 5D
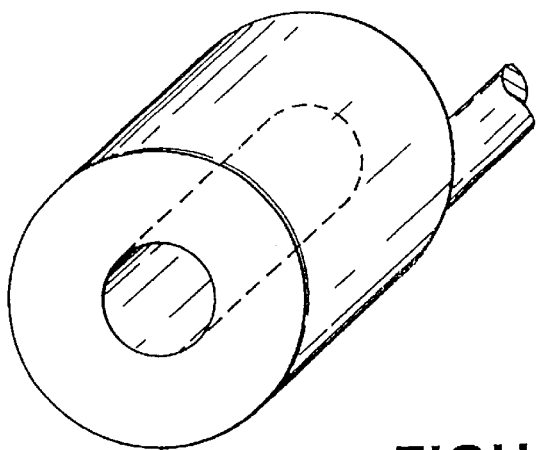
FIGURE 5E
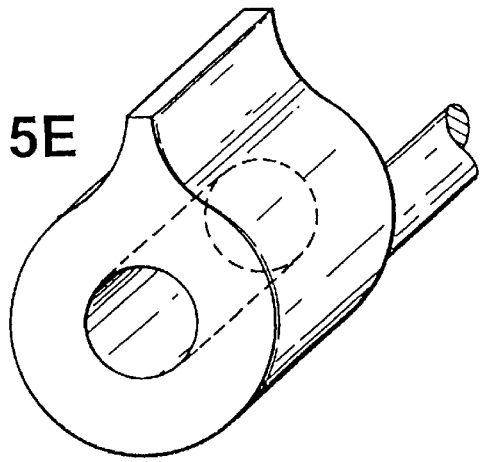

REGISTRATION

EVENT ACCESS REQUEST

EVENT ACCESS REQUEST

CARD CONVERSION

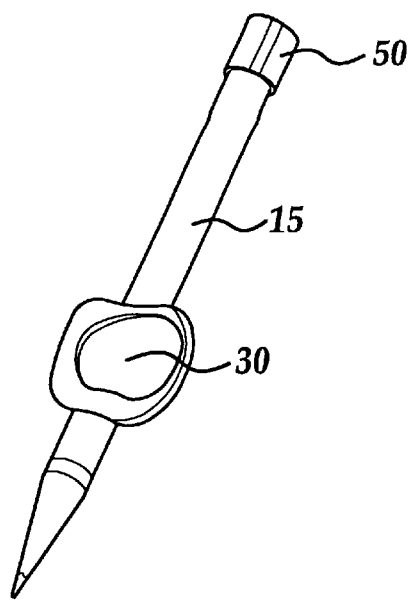
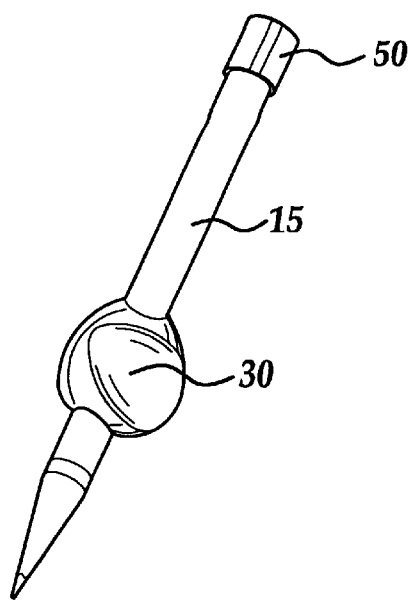
*Figure 14A*    *Figure 14B*
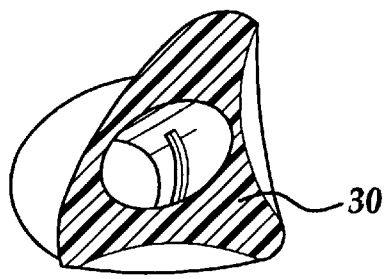
*Figure 14C*
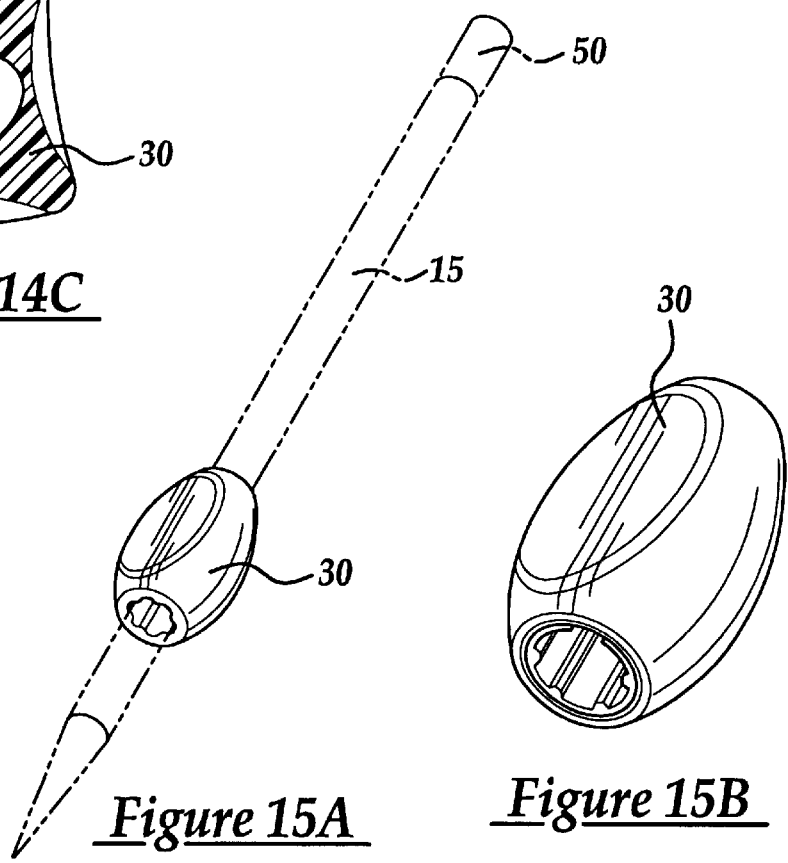
*Figure 15A*    *Figure 15B*

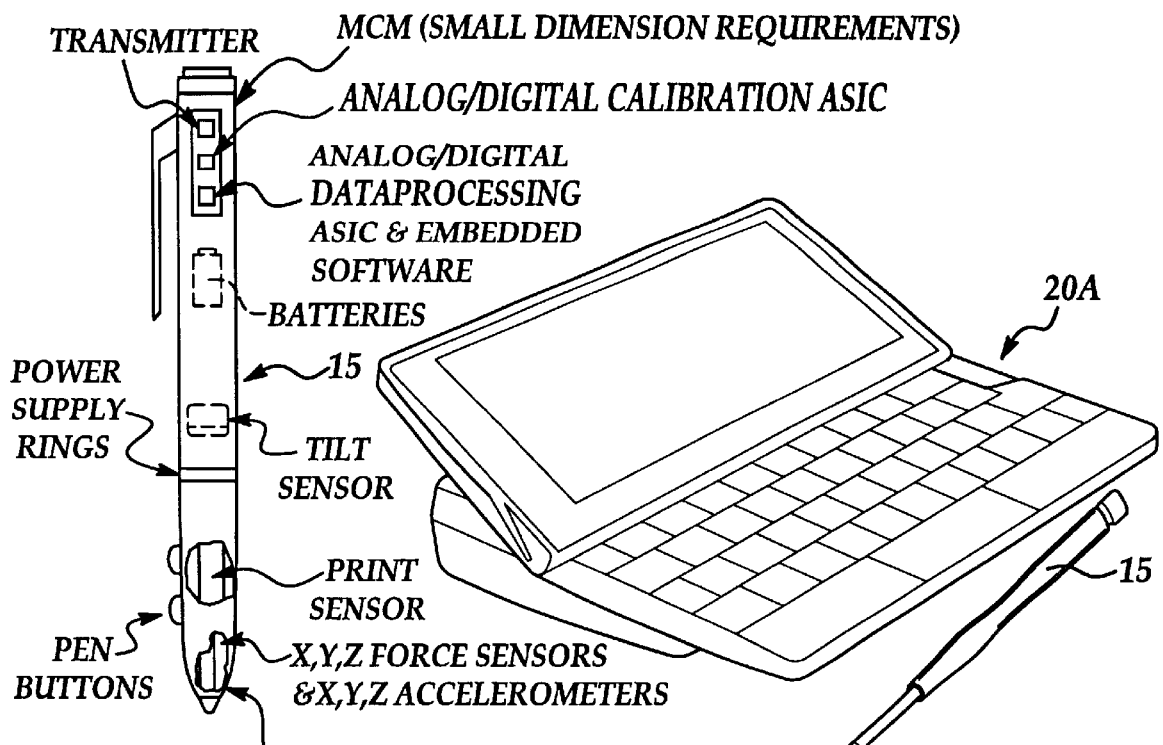
Figure 16
Figure 17A
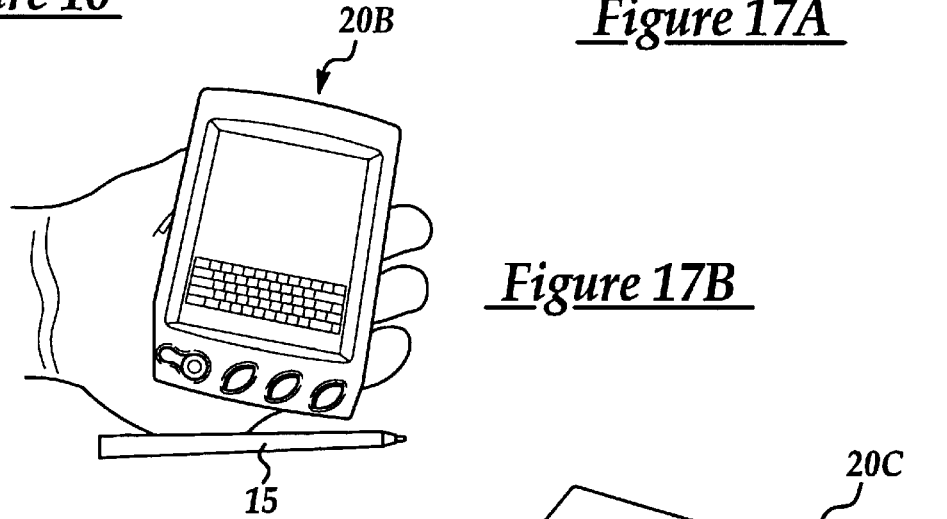
Figure 17B
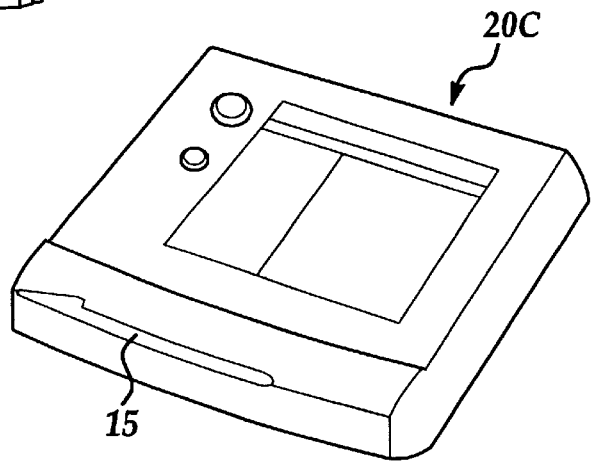
Figure 17C

WRITING IMPLEMENT FOR IDENTITY VERIFICATION SYSTEM

This Application is related to and claims priority under U.S. Provisional Application No. 60/163,433 filed Nov. 3, 1999; U.S. Provisional Application No. 60/154,590 entitled "Writing Implement For Identity Verification System" filed Sep. 17, 1999, U.S. Provisional Application No. 60/144,028 entitled "Biometric Pen And Encryption Device" filed Jul. 16, 1999, PCT Application No. PCT/US99/07900 entitled "Biometric Hotel and Casino Play" filed Apr. 7, 1999, U.S. Provisional Application No. 60/119,408 entitled "Identification Confirmation System" filed Feb. 10, 1999, U.S. Provisional Application No. 60/116,212 entitled "Identification Confirmation System" filed Jan. 12, 1999, U.S. Provisional Application No. 60/114,632 entitled "Identification Confirmation System" filed Jan. 4, 1999, U.S. Provisional Application No. 60/109,511 entitled "Biometric Writing Implement" filed Nov. 23, 1998, U.S. Provisional Application No. 60/088,498 entitled "Biometric Hotel and Casino Play" filed Jun. 8, 1998, and U.S. Provisional Application No. 60/080,962 entitled "Biometric Hotel and Casino Play" filed Apr. 7, 1998.

FIELD OF THE INVENTION

The invention relates generally to a system for authenticating the identification of a person using biometric means, and more particularly, for use at point-of-sale terminals, for use in various closed environments, for accessing a computer network, for applications involving pen-based computers and smart-pens, and for e-commerce.

BACKGROUND OF THE INVENTION

Wireless (e.g., radio, infrared, microwave) communication links now enable computer systems comprised of very small portable computers that have the capability of being networked at all times and in all locations. Production of small, portable computers is the strongest trend in the computer industry, and wireless communication is one of the strongest trends in the telecommunication industry.

The visible difference of pen-based computers from other technologies is in the use of a stylus (e.g.—a pen or pencil) as the primary means of interaction between a user and a machine, picking up the familiar pen and paper interface metaphor. With pen computing, a pen-like stylus is used on a digital surface to write and annotate information. Within the special computer is contained a digitizer which captures and interprets the text that is entered.

The global workforce is increasingly mobile and pen-based computing is on the rise. Smart handheld devices are emerging from the realm of individual purchases to enterprise deployment as they become key tools for connectivity to the corporate environment. Development of handheld applications and wireless technology tailored for the enterprise represent are serving the increasing the remote and mobile worker population.

Credit cards were originally introduced to for use at POS terminals to replace charge-a-plates. Plastic charge cards, debit cards, ATM cards, stored value cards are fair game for thieves. It is not uncommon for people to carry more than eight cards in their wallets. The cards must be replaced every few years, and the cards may become damaged with frequent usage. In addition, consumer fraud and card counterfeiting are on the rise. The cards can be easily lost or stolen, signatures can be easily forged and PIN's can be readily determined by others. Hence, while plastic cards are easier to carry than money, they are almost as negotiable as money to sophisticated criminals.

Also, a devastating pattern of security lapses is laid out in a 1999 congressional report on China's acquisition of America's most vital nuclear and missile secrets. Beijing remains far from nuclear parity with the United States. The federal government is right to concern itself with protecting America's computer networks against cyber attacks by terrorists or foreign governments. Computer network security is a real and growing problem. The Federal Government needs to protect not just sensitive defense secrets, but also the computers that manage air traffic control, Social Security, Medicare and a host of other civilian programs. Also, while E-commerce and smart pen technology find increased acceptance, the future growth of these technologies will continue to be hampered by security concerns.

The use of physical attributes—fingerprints, a voiceprint, or any of several other characteristics—to verify identity has great potential. Passwords and personalidentification numbers (PIN's) are fraught with problems. Biometrics offers solutions. Applications that are preparing to accept biometric data include computer networks, ATMs, cars, cellular phones, and dozens of other types of embedded systems.

Widespread acceptance of biometrics means use in areas that daily affect the lives of millions of people. By replacing PIN's, biometric techniques prevent the unauthorized access to or fraudulent use of ATM's, cellular phones, smart cards, desktop PC's, workstations, and computer networks. For financial transactions conducted via telephone and wire, biometrics can replace PIN's and passwords. In buildings and work areas, biometric techniques replace keys, badges, and readers.

By replacing PIN's for transfers of funds to the cards, biometrics enhance the security of credit/debit-card (plastic-money) systems and prepaid telephone calling cards. Biometric techniques also provide security not previously envisioned for "cash" balances stored in such cards. For POS terminals, biometric techniques can replace a clerk's verification of a customer's signature.

Biometric techniques can also potentially replace driver's licenses or passports for authenticating the identity of airline passengers. Similar techniques can replace or supplement passports and visas for establishing the identity of people seeking to cross national borders at customs and immigration checkpoints.

In hospitals, biometric techniques can replace ID bracelets to establish patients' identities-for example, before blood administration. Biometrics could help confirm the identity of people seeking public assistance, Medicare, and other government and insurance benefits.

In these applications, biometrics would replace or supplement a variety of systems, of which photo ID's are probably the most popular. Biometrics can also authenticate e-mail and other documents transmitted via computer networks.

An example of a rapidly growing biometric technology, fingerprints offer an infallible means of personal identification and are rich in information content. The use of fingerprints for identification dates back many decades, but gained wide acceptance about 100 years ago. Fingerprints are the biometric that form the basis of all worldwide identification. Fingerprints don't change with time while other physical characteristics do. Fingerprint minutiae uniquely identify fingerprints. It has been proven that minutiae, were unchanging and repeatable features of each fingerprint, and were individually unique. Each finger has a unique arrangement of ridge detail. There are two major types of information in a fingerprint. First is the ridge flow information, and second is the specific features or minutiae (minutia) of the fingerprint. As used herein, the term "minutia" is used to denote both the singular and plural. Fingerprints uniquely identify an individual based on their information content. Information is represented in a fingerprint by the minutia and their relative topological relationships. The number of minutia in a fingerprint varies from one finger to another, but, on average, there are about eighty (80) to one hundred and fifty (150) minutia per fingerprint. In the fingerprint context, a large store of fingerprints exists in law enforcement offices around the country. Since fingerprints never change, a person need only be fingerprinted once to be in the system.

U.S. Pat. No. 5,680,470 (Moussa et. al.) discloses a method of signature verification involving a set of template signatures that are examined for test features which are normalized and irrelevant features are removed. Similarly, U.S. Pat. No. 5,559,895 (Lee et al.) discloses a system for real time signature verification where the signatures are digitized for statistical analysis and various personal features are selected.

Current stylus-type verification systems use metric-type sensors—accelerometers and pressure sensors to measure stylus pressure and stroke sweep in the users' signature. U.S. Pat. No. 5,774,571 (Marshall) discloses a stylus with multiple sensors for biometric verification including grip pressure sensors and gyroscopes. U.S. Pat. No. 4,513,437 (Chainer et al.) discloses another data input stylus for signature verification which includes accelerometers and pressure sensors. U.S. Pat. No. 5,247,137 (Epperson) discloses a stylus that enables biometric identification by means of comparison of graphics data and textural data from a remote location. The stylus also captures strokes and gestures which can also be used for confirming identification. U.S. Pat. No. 5,103,486 (Grippi) discloses a system for using a combination of biometrics at POS terminals. Prisms are used to capture the fingerprint of the index finger while the individual signs his/her name. The fingerprint image and the signature are processed to form a composite representative for comparison with information shown on a credit card for processing of commercial transactions.

What is needed is a pen-based system that enables an event to occur only when identity has been confirmed, the system employing state-of-the-art sensors (a) that can be used for signature verification at point-of-sale terminals that captures biometric data in a nonobtrusive manner, while serving as a system that can eventually replace card-based transaction systems; (b) that can authenticate identity continually in pen-based computing systems to ensure that the person seeking access to information has pre-approved authorization for such access; and (c) that is compatible with smart pens ensuring the use of the pen and access to data through the pen has been pre-approved.

What is needed is a system that is compatible in smaller closed environments where the size of the community is limited for confirmation of event access without the need for encryption techniques once identification has been verified by biometric means; a system that enables the use of biometric sensors in a broad range of applications while eliminating the need for separate biometric sensors and units with wiring that would otherwise need to be integrated into the existing systems; that is user friendly, nonobtrusive to use, virtually impregnable to criminals, that enables authorized access to certain events while barring unauthorized access, that can be readily adapted to include any number of pen-based applications What is needed is a pen-based system that is compatible with encryption technology so that event access is confirmed locally (a) eliminating most privacy concerns (b) simplifying system logic while improving system speed, and (c) reducing the complexity and cost of the biometric sensors.

What is needed is a pen-based system that will provide customers with the privacy that they may want while ensuring the integrity of their accounts and their name; a pen-based system that requires no hardware at the point-of-sale terminal other than a stylus (many similar type styli being already in place); a system that will significantly reduce transaction time; a system that is convenient to use and unobtrusive to customers; a system that provides improved processing speed and accuracy; a system that is secure and safe from illegal entry; and a system for confirming personal identification that is reliable, a system that will actually discourage thieves.

SUMMARY OF THE INVENTION

The identity verification system of the present invention addresses these needs and revolutionizes the nature of pen-based event access. Positioned at the center of the system is a stylus with any of a number of biometric properties or their combination or with one or more metric sensors, while the user signs his/her name, or even for writing anything. The identity verification system of the present invention can be used at POS terminals, in various controlled environments, to access a computer network, in applications involving pen-based computers and smart-pens, for e-commerce, conventional writing implements, and multi-purpose writing implements.

The biometric properties that can be captured include, but are not limited to, fingerprints (fingerprint sensors), voice recognition (e.g.—microphone), facial imaging (e.g.—camera), and DNA and other biotech properties (e.g.—cell capture/analysis sensors). Metric properties include, but are not limited to, grip and point pressure (e.g.—pressure sensors), position of the index finger relative to the point, position of the thumb relative to the index finger (e.g.—thermal sensors), angle of the stylus during usage (e.g.—a gyroscope), speed of signing (e.g.—a timer), increases and decreases of speed during signing (e.g.—an accelerometer). The stylus is either tethered (attached) to each site or is portable, one such stylus being carried by each user.

In a first preferred embodiment of the identity verification system of the present invention, one-to-many biometric matching is used. This embodiment is particularly useful in controlled environments such as hotels, hospitals, and military bases, where the size of the community is limited. One or more biometrics (and metrics) are captured for reference purposes during registration. During each event access request, the community of reference prints is searched for a match with the user. Each member of the community need carry nothing on his/her user to participate in the system.

In a second preferred embodiment of the identity verification system of the present invention, one-to-one biometric matching is used. This embodiment requires each user to carry on his/her user a device that includes an encrypted reference biometric for reference purposes to gain access into the system. The encryption device can be the stylus, a card, a stylus insert (as herein described), or a device carried on a key-chain. Processing speeds for this embodiment considerably faster than the first preferred embodiment, since the system need only make a "MATCH" or "NO MATCH" decision. While the processing can occur at a central computer, it is preferred that the matching logic be at the access site, inside a smart card, or inside a smart pen to minimize privacy concerns.

One preferred application for the identity verification system of the present invention involve pen-based computing systems. Pen-based computer systems are ideal for applications which require: (1) highly portable devices—that are no longer constrained by a keyboard; (2) intuitive features—that resemble an environment familiar to the users; (3) improved efficiency,—that enables accurate data collection and manipulation; and (4) flexibility—that enables a wide variety of types of data entry. Several applications of the identity verification system of the present invention include:

> Nurses and doctors can track and record patient histories as they make their rounds, using clipboard-like computers and pens to access and enter patient information over a wireless network from servers throughout the hospital.
>
> Insurance claims adjusters can assess automobile damages on site, looking up relevant cost information with the pen, then printing the estimate and writing a check to the repair shop at the end of the visit.
>
> Sales representatives can track inventory and the effect of promotional campaigns in retail stores, using a pen computer. At the end of the day, the information is transmitted through a phone line back to headquarters.

Another premier application of the identity verification system of the present invention involves POS terminals with either one or two fingerprint sensors disposed within the stylus. The stylus enables signature verification at POS terminals, either with credit-type cards, or in lieu of such cards. The user signs his/her name using the biometric stylus. The prints are again captured and compared to the prints of all registrants in search of a match. Once the financial institution confirms that there are sufficient funds in the account, the amount is debited from the account, and the transaction is approved.

The stylus enables the conversion at POS terminals when used to verify signatures. A cardholder can transfer fluids into a new account at a POS terminal by use of a credit card at a POS terminal by using the stylus of the present invention. The cardholder swipes his/her card through the cardreader and signs and prints his/her name using the stylus of the present invention. The prints are captured and the cardholder advises the credit card financial institution of the amount to be transferred. Account information is exchanged and the card is not needed next time.

Registration using the identity verification system of the present invention is similar to opening a new bank account. Initially, the user registers by using the stylus. The applicant provides the financial institution with basic information; name, address, phone number, and signature. The only difference is that the stylus of the present invention enables the capture of biometric data while the applicant signs his/her name. Another way to register at POS terminals, is to replace styluses currently used for signature verification with the biometric styluses of the present invention. Once the prints are initially captured, the card isn't needed. The next time the cardholder wants to access the same account he need only sign his/her name. Of course, the cardholder can also continue to use the card.

Styli with metric sensors and signature verification systems are already beginning to appear at some POS terminals. These stylus do not capture fingerprints, but rather are used only for purposes of signature verification. Initially, the system of the present invention will verify signatures replacing these styluses. Next, the use of credit and debit cards will become optional.

For a more complete understanding of the identification verification system of the present invention, reference is made to the following detailed description and accompanying drawings in which the presently preferred embodiments of the invention are shown by way of example. As the invention may be embodied in many forms without departing from spirit of essential characteristics thereof, it is expressly understood that the drawings are for purposes of illustration and description only, and are not intended as a definition of the limits of the invention. Throughout the description, like reference numbers refer to the same component throughout the several views.

BRIEF DESCRIPTION OF THE DRAWINGS

FIG. 1B discloses a preferred embodiment of a functional block diagram of the identity verification system of the present invention;

FIG. 2A discloses a writing stylus with fingerprint sensors for use in the system of the present invention with a built-in grip;

FIG. 2B discloses a section of the writing stylus shown in FIG. 2A taken along 2A—2A;

FIGS. 5A, 5B, 5C, 5D, and 5E disclose various grip configurations that are compatible with conventional styluses and pencils, the grip including a cord connection to the writing surface, and sensors being incorporated into the grip;

FIGS. 14A, 14B and 14C disclose a third preferred embodiment of the stylus insert of the present invention;

FIGS. 15A and 15B disclose a fourth preferred embodiment of the stylus insert of the present invention;

FIG. 16 shows the identity verification system of the present invention as incorporated into a smart pen;

FIGS. 17A, 17B, and 17C show the stylus system of the present invention as used various configurations of pen-based computers, including (a) a lap-top computer, (b) a palm-type computer; and (c) a hand-held computer, respectively;

DETAILED DESCRIPTION OF THE PREFERRED EMBODIMENTS

Figure 1A:
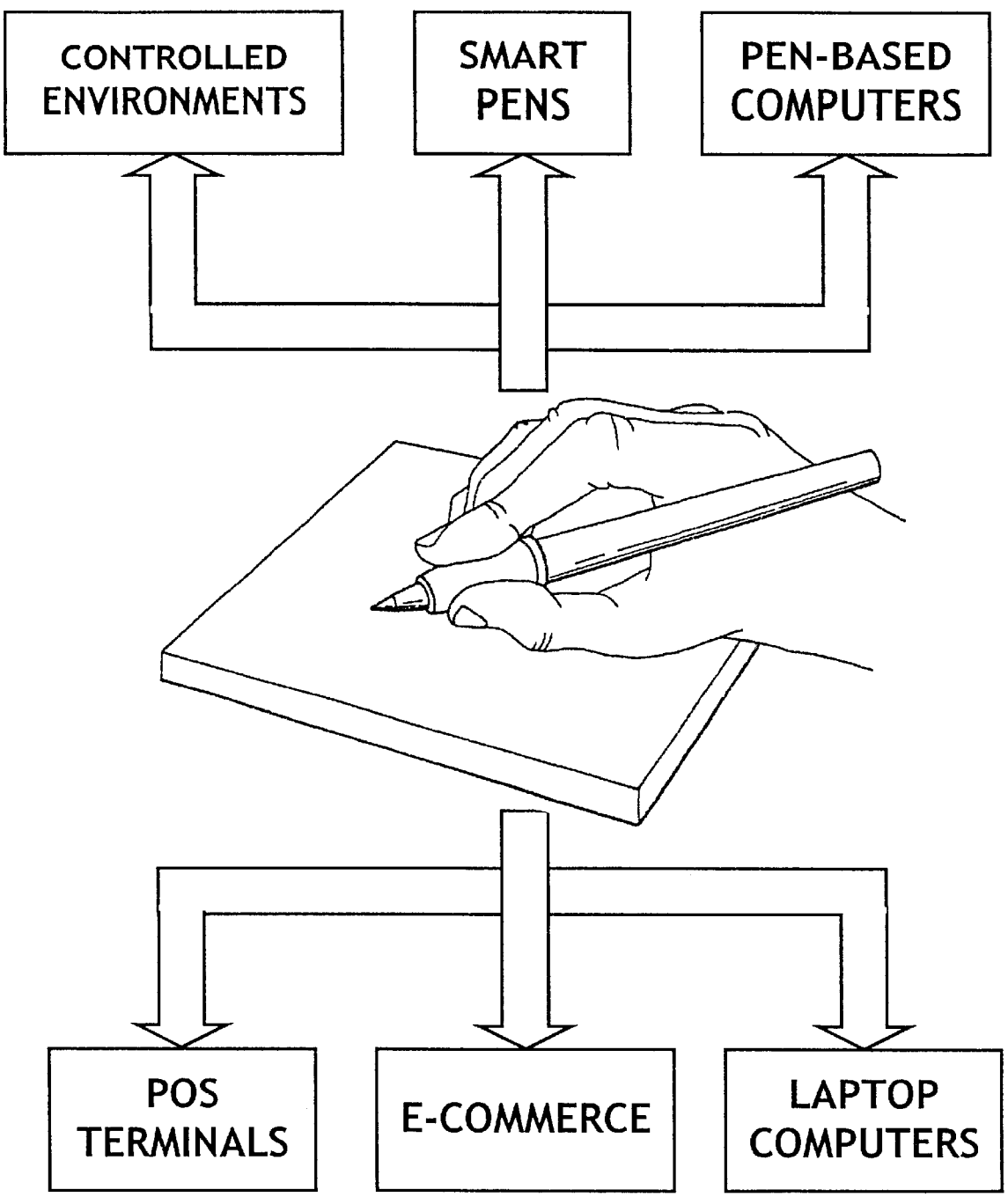
FIG. 1A discloses the preferred embodiment of the multi-purpose stylus of the present invention.

Referring now to the drawings, in the broadest terms the preferred embodiment of the identity verification system of the present invention as shown in FIG. 1 comprises a stylus 15 with biometric sensors 20 disposed in a grip 30, and a computer processing unit 40.

As used herein unless the context indicates otherwise, a "stylus" is any device that is compatible with either the hand or finger of the user for purposes of making a marking on an essentially flat surface. While the drawings depict a conventional shape of a stylus, other shapes and designs are also included within the scope of the present invention such as any attachment to a finger or any implement that can be held with a hand for such purpose. Also, as used herein unless the context suggests otherwise, the term "fingerprint" refers to either the print of the index finger or the thumb. In addition, as used herein unless the context suggests otherwise, the term "biometric" that are unique to the actual physical features of the user including, but are not limited to, fingerprints (fingerprint sensors), voice recognition (e.g.— microphone), facial imaging (e.g.—camera), and DNA and other biotech properties (e.g.—cell capture/analysis sensors). The signature of the user is generally not considered to be a biometric, unless otherwise indicated in the context of which it is used. Biometrics are to be distinguished from the term "metrics" which include, but are not limited to, grip and point pressure (e.g. pressure sensors), position of the index finger relative to the point, position of the thumb relative to the index finger (e.g.—thermal sensors), angle of the stylus 15 during usage (e.g.—a gyroscope), speed of signing (e.g.—a timer), increases and decreases of speed during signing (e.g.—an accelerometer).

The stylus 15 of the present invention has numerous uses, and primarily for purposes of illustration, include signature verification at POS terminals, pen-based computers user identification, and to provide improved convenience to guests within various controlled environments.

Positioned at the center of the system is a stylus 15 with any of a number of biometric properties or their combination or with one or more metric sensors, while the user signs his/her name, or even for writing anything. The identity verification system of the present invention 10 can be used at POS terminals, in various controlled environments, to access a computer network, in applications involving pen-based computers and smart-pens, and for e-commerce, conventional writing implements, and multi-purpose writing implements. The stylus 15 is either tethered (attached) to each site or is portable, one such stylus 15 being carried by each user.

In a first preferred embodiment of the identity verification system of the present invention 10, one-to-many biometric matching is used. This embodiment is particularly useful in controlled environments such as hotels, hospitals, and military bases, where the size of the community is limited. One or more biometrics (and metrics) are captured for reference purposes during registration. During each event access request, the community of reference prints is searched for a match with the user. Each member of the community need carry nothing on his/her user to participate in the system. This embodiment can also be used in open environments in combination with the user supplying additional information during each request for event access (i.e.—printed name, phone number, social security number). See for example U.S. Pat. No. 5,805,719 (Pare, Jr., et. al.).

In a second preferred embodiment of the identity verification system of the present invention 10, one-to-one biometric matching is used. While this system can also be used in controlled environments, it is preferred in open environment situations where the size of the community is continually expanding through registration without limitation. This embodiment requires each user to carry on his/her user a device that includes an encrypted reference biometric for reference purposes to gain access into the system. The encryption device can be the stylus 15, a card (e.g.—credit, debit, ATM, check, driver's license, identification card), a stylus cap, a stylus grip a stylus insert 50 (as herein described), a device carried on a key-chain, as a piece of jewelry, as an implant device, or by some other means. The encryption device is compatible with the system described in copending PCT Application PCT/US99/07900. Processing speeds for this embodiment considerably faster than the first preferred embodiment, since the system need only make a "MATCH" or "NO MATCH" decision. Since the matching is preferably one-to-one as opposed to one-to-many, the quality of the sensor need not be forensic quality although one is preferred and, only one sensor is needed. While the processing can occur at a central computer, it is preferred that the matching logic be at the access site or a regional site to minimize privacy concerns.

Preferably, the processing occurs within the pen, an identification card, a smart card, or within a processor at the site of the transaction. In another preferred embodiment of the present invention 10, the processing occurs at the POS terminal. In yet another preferred embodiment of the present invention 10, the processing takes place at a regional computer. Localized processing is preferred for purposes of simplicity, speed, and to ensure individual privacy. As the processing moves up the chain, it becomes more complex.

Of all the areas of biometrics, fingerprint sensing has captured the imagination of the largest number of companies. Four integrated circuit manufacturers embody unusual fingerprint-sensing technologies in new chips. ST Microelectronics and Veridicom provide integrated circuit approaches—are dc-capacitive sensors. Harris Semiconductor Corp. provides an ac-capacitive sensor. Thomson-CSF's FingerChip uses thermal sensing. Each integrated circuit sensor produces a high-resolution (several-hundred-pixels by several-hundred-pixels by 8 or 16 bits) image of a finger tip. These images are comparable with those obtained by pressing inked finger tips onto absorbent paper. Automatic fingerprint-identification systems can process images obtained from biometric sensors just as easily as from images obtained from inked fingers.

In uncompressed form, the images occupy several hundred kilobytes. Many fingerprint-based authentication systems store the images in a compressed form, in which they occupy approximately 10 kbytes. Although the image compression employ lossy algorithms, the algorithms are tuned for fingerprint recognition. Generally, there is little or no difference between the original and the decompressed images. An even more compact way to store the important features of fingerprints is to extract minutiae. Minutiae are the points at which fingerprint patterns branch and end. A minutiae file can occupy as much as 1200 bytes. Either way, minutiae files significantly compress the original image.

The dc-capacitive fingerprint sensors from ST Microelectronics and Veridicom comprise of rectangular arrays of capacitors on a silicon chip. One plate of the capacitor is the finger to be sensed; the other plate is a small area of a pixel disposed upon the surface of the chip. The finger is positioned against the surface of the chip—actually, against an insulated coating on the surface of the chip. The ridges of the fingerprint are close to the nearby pixels and have high capacitance. The valleys are more distant from the pixels nearest them and have lower capacitance. The sensor then draws a fixed charge from each pixel in turn—that is, it scans the pixels. A high voltage appears on pixels to which the finger has low capacitance, and a low voltage appears on pixels to which the finger has a high capacitance.

Veridicom, Inc. uses a CMOS chip. These plates are covered with a thin layer of dielectric. When a finger is placed on top of the chip, each sensor acts as the bottom plate of a capacitor, with the surface of the finger acting as the top plate. The Veridicom chip is as small as a postage stamp—can be easily embedded into laptop computers and keyboards. Accompanying circuitry measures the capacitance of each of these sensors. Fingertip "valleys" are further from the chip, and show as a lower capacitance. Fingertip "ridges" yield a higher capacitance. The chip's dielectric technology enables people to touch the sensitive, silicon chip without destroying it. The dielectric is chemically and mechanically strong enough to allow repeated contact with people's fingers, yet electronically sensitive enough to capture the prints. Other suppliers of CMOS fingerprint sensors are Siemens, and Harris.

Identicator Technology Inc. uses Identicator's DFR-200 reader technology and its software algorithm technologies. A matchbox-sized fingerprint reader enables full feature extraction and match in less than one second. Instead of entering an ID and password to get into a corporate network, users simply put their finger atop the glass lens of a tiny reader affixed to the personal computer. The device photocopies the print and compares it to a database of thousands of other prints in well under a second. The Identicator print sensor enables secure user authentication on PC's.

TouchSafe Personal from Identrix is a state-of-the-art fingerprint verification reader. The design works with portables, desktops or servers, and assists with finger placement. TouchSafe Personal uses an internal 32-bit RISC processor, compact optics and encrypted serial communications. The optional smart card reader can store the fingerprint template and other confidential data. The Identix TouchPrint 600 Live-Scan Workstation is a fingerprint system that produces forensic-quality tenprint records by electronically scanning and capturing rolled fingerprints.

ST Microelectonics Model #STFP2015-50, a fingerprint sensor, TouchChip, clusters 100,000 sensors onto a 20-by-15-millimeter surface. The sensors, which individually measure 50-by-50 micrometers, incorporate an active pixel and two capacitive plates per sensor element. All told, the array consists of more than 98,000 pixels, enabling it to achieve resolutions of 508 dpi. Two metal plates are placed in the cell area, separated by a passivation oxide. The skin surface acts as a third plate, separated by a dielectric layer with variable thickness. The sensors convert the distance between the finger and the surface of the device to an electrical signal, and because fingerprint valleys are farther from the sensor surface than ridges, they produce a different output. Since the chip is sensitive to 3-D contours, it can't be fooled by photographic images. The chip includes an 8-bit parallel data interface and an I2C interface. Power consumption is less than 200 megavolts at 5 volts. An on-board A/D converter eliminates the need for much of the external circuitry. It's basically a stand-alone sensor, and the sensor is so small that you can incorporate it onto a keyboard, PC, or cell phone.

The stylus 15 includes one or more sensors 20 that capture biometric properties of the user. The computer (chip) 40 processes the captured information to determine whether to enable access to an account/network/entry, or other entry or privilege once identification has been confirmed. In one preferred embodiment, the system includes means to enable the user to enter a primary identifier, the identifier being a series of letters, digits, a spoken word converted to text (speech recognition), or the like. The primary identifier is preferably the user's printed name, the user's birthday (and year), zip code, mother's maiden name, or PIN or password.

Figure 11:
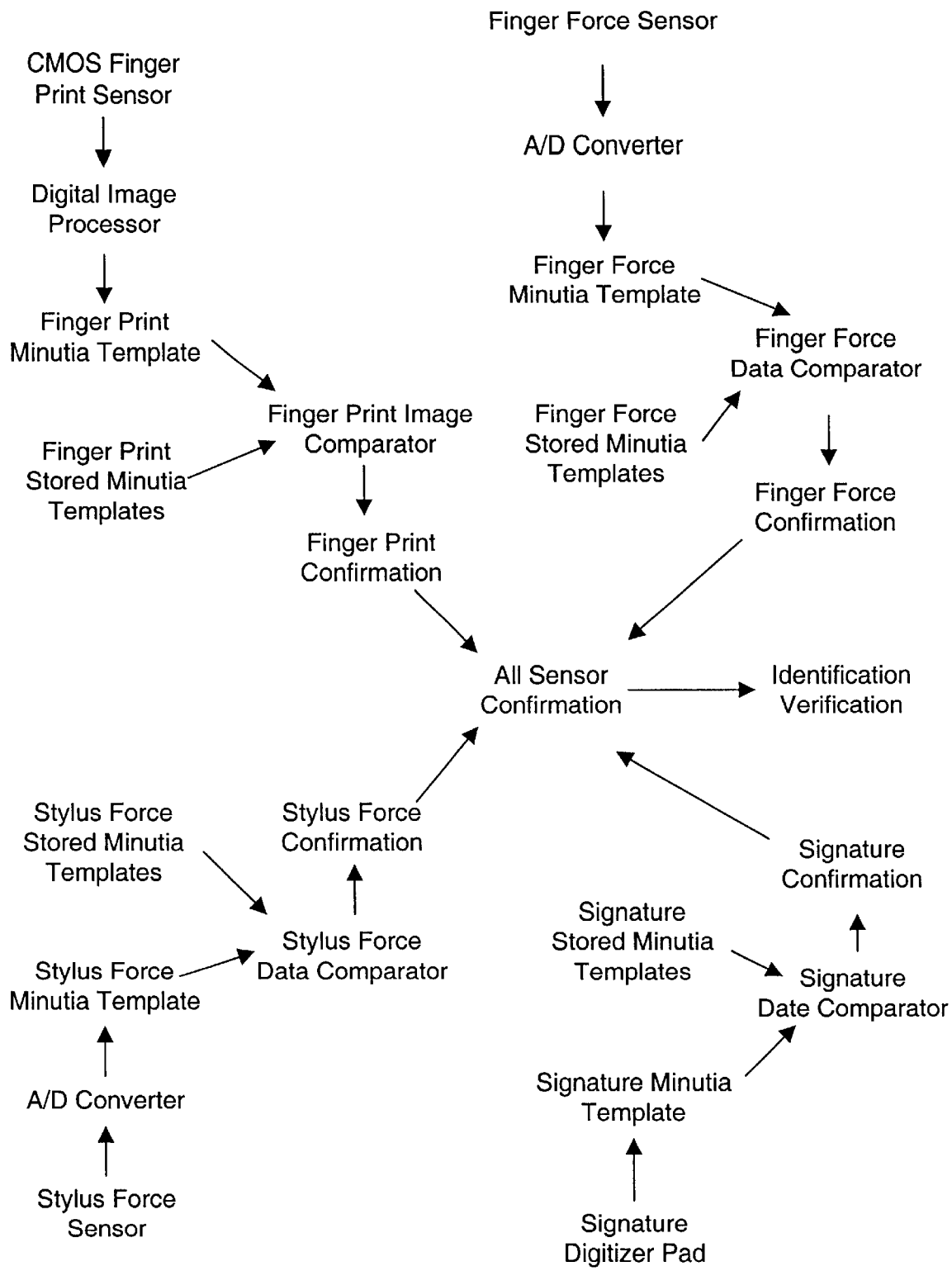
FIG. 11 discloses another preferred embodiment of a simplified process flow path for identity verification using the biometric identification system of the present invention.

The biometric stylus 15 of the identity verification system of the present invention 10 has print imaging sensors 20 in the grip 30 to sense the index fingerprint and thumb print, in addition to other biometric sensors 20 including but not limited to the following: pressure sensors (point and grip); accelerometers; gyroscopes; position of index finger relative to point; position of thumb relative index finger. FIG. 11 discloses a simplified logic diagram where multiple biometric sensors 20 are used to determine account confirmation.

The biometric stylus 15 of the identity verification system of the present invention has print sensors 20 positioned within the unique grip 30 (see FIGS. 2A and 2B). Electronic images of the index finger and thumb are extracted during use. Thereafter, the user utilizes a similar stylus 15 to submit a set of prints for comparison with the set of prints of the authorized user—the prints either match or don't match. The use of two prints makes a mistake highly unlikely. The stylus 15 thwarts forgers since even if the signature is the same the prints are not (the content of the writing is unimportant). The stylus 15 is provided by financial institutions, POS terminals, and government agencies worldwide. The principles of the biometric stylus 15 are combined with other biometrics housed within the stylus 15 to provide near perfect confirmation. Digital systems evaluate the fingerprint by comparing the similarity, number, and unit relationship of the points of distinction.

There are several basic embodiments of a fingerprint stylus 15;

(1) a stylus 15 is attached or tethered to a system;

(2) a device compatible with the tethered stylus 15 is completely portable; and (3) a stylus 15 for a pocket or hand-held computer that is personal to the individual.

Figure 12A:
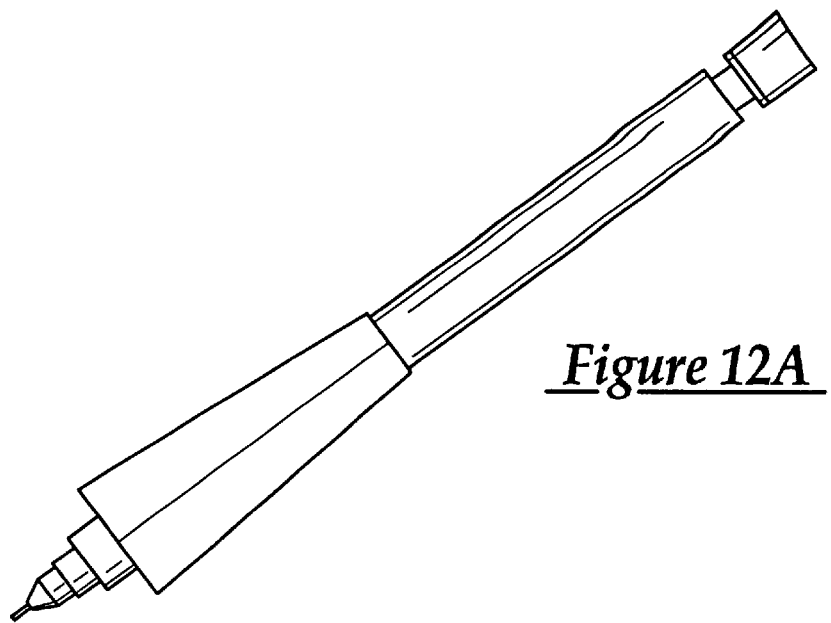
FIGS. 12A and 12B disclose a first preferred embodiment of the stylus insert of the present invention.
Figure 12B:
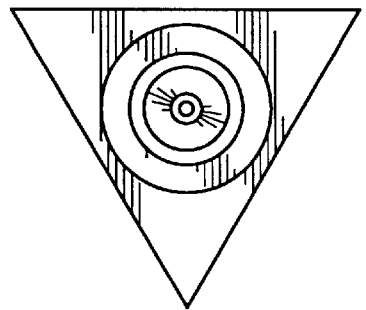
Figure 13A:
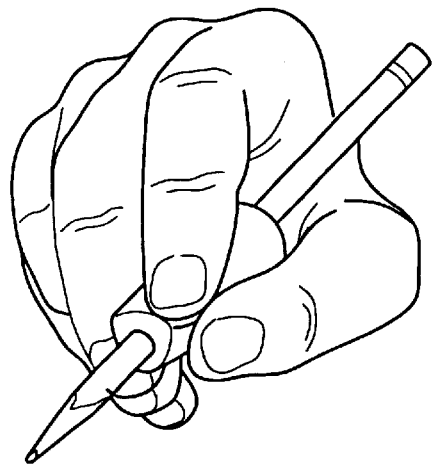
FIGS. 13A and 13B disclose a second preferred embodiment of the stylus insert of the present invention.
Figure 13B:
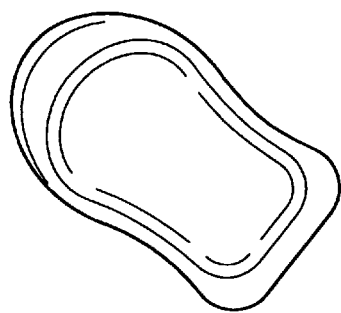
Figure 18:
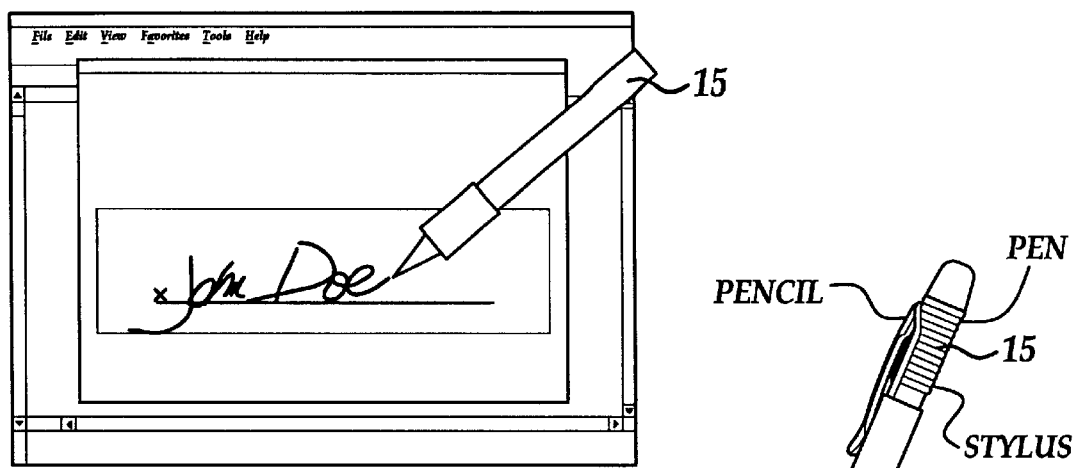
FIG. 18 shows the identity verification system of the present invention in an e-commerce application being used when the user signs his/her name.
Figure 19:
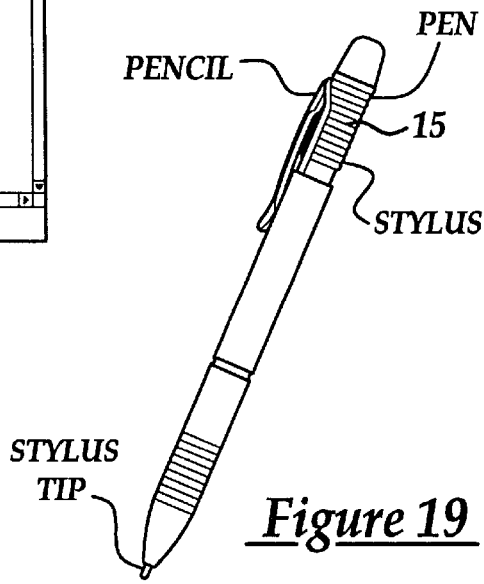
FIG. 19 shows the identity verification system of the present invention as used in a multi-purpose application, including a conventional pen, a conventional pencil, and a stylus for use with a pen based computer.

FIGS. 12A and 12B disclose a first preferred embodiment of the stylus insert 50 of the present invention; FIG. 13A and 13B disclose a second preferred embodiment of the stylus insert 50 of the present invention; FIGS. 14A, 14B and 14C disclose a third preferred embodiment of the stylus insert 50 of the present invention; and FIG. 15A and 15B disclose a fourth preferred embodiment of the stylus insert 50 of the present invention.

In another preferred embodiment, the insert 50 fits onto the cap of the stylus 15. The term "insert" as used herein is a device that includes an encrypted reference identifier. The insert 50 contains the encrypted print and the name of the user owning the card. The insert is also linked to one or more accounts. The grips 30 are for use with a narrow stylus 15 about the size of a pencil or a conventional BIC® pen. This enables a deeper grip 30. The grip 30 almost completely surrounds the index finger enabling the use of a sensor the size of a postage stamp. Almost any sensor the size of a postage stamp which is the size of most fingerprint sensors. Also, single sensor may be used in sites where smaller transactions are involved. The stylus insert 50 of the present invention is preferably stored in wallet or on key-chain for ready availability. The insert 50 is compatible with the system described in copending PCT Application PCT/US99/07900.

There are numerous advantages to having a stylus 15 or an encrypted print for each user: (a) the biometric sensing is far less complex since the sensors 20 need only confirm a one-to-one match and generally only one sensor is needed (eliminating the need for identifiers). (b) there is no need for a master databank of biometric prints—each print can be encrypted into the stylus 15 (much like a smart-card). (c) no sensors are needed at POS terminals, as the sensor in the stylus 15 is used to match the encrypted registered biometric print. (d) the privacy issue is significantly overcome since the only matching is needed is in the pen-based computer.

The registered biometric print can also be encrypted in a smart card 60 within a conventional credit, debit, or check card. This embodiment is fully compatible with current encryption technology where one or more prints are already being preserved in the smart card 60 for use at POS terminals with a sensor unit positioned at each terminal—these sensor units can be replaced by the stylus 15 of the present invention. However, the encrypted print can also be within a smart driver's license or a social security card.

Figure 20A:
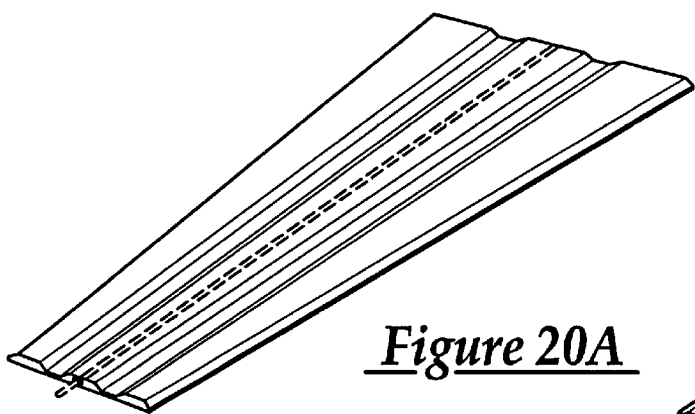
FIG. 20A discloses still yet another preferred embodiment of the identity verification system of the present invention, the stylus being foldable into a card, the card having an IC chip with an encrypted biometric print and biometric print sensors embedded in the card, the card-pen being compatible with conventional card readers, the card-pen beingun foldable lengthwise for transformation into a pen.
Figure 20B:
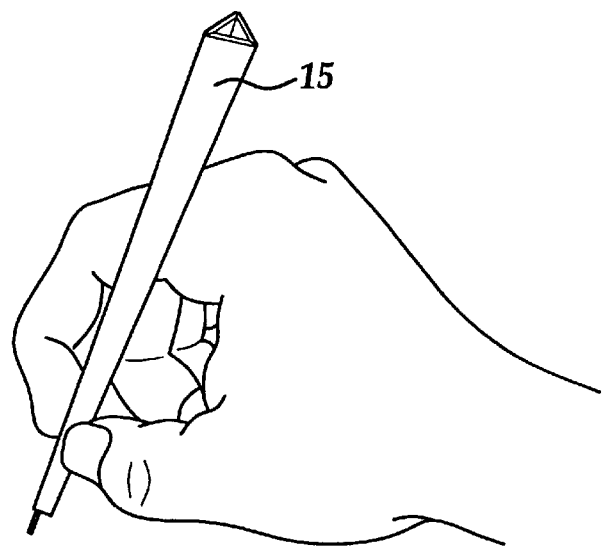
FIG. 20B shows the card of FIG. 20A after folding for use as a stylus.

In a first series of preferred embodiments of the identity verification system of the present invention 10, the system need only perform a one-to-one match to confirm user identification. This is accomplished by (1) the user who owns and carries his/her own pen; (2) the user carrying an insert 50 on his/her user that includes an encrypted print, the insert 50 being compatible with the stylus 15 tethered to one of the terminals; (3) the user carries on his/her user a pen-based computer that is compatible with the computer network of the system; (4) the user carries on his/her user a credit/debit-type card that includes an encrypted print in either the magnetic stripe or an IC element of a smart card; and (5) the user carries on his/her user a card that becomes a pen (for example, see FIGS. 20A and 20B), the card-pen including an encrypted print in either the magnetic stripe or an element of a smart card.

The user need only employ the stylus 15 of the present invention for signing purposes. Once a print is captured, it is compared with the encrypted print in the smart card 60. If there is a match the event is allowed to proceed. If there is no match, the event is blocked.

The insert 50 is compatible with the stylus 15 or the stylus grip 30 or the stylus top (retractable point) and enables access with one-to-one matching for a wide variety of computer security applications—for controlling access to network services, or anywhere a password, cookie, token, digital certificate or smartcard is used. The insert 50 can be plugged into any standard USB port. Like smartcards and other cryptographic tokens, the insert 50 provides an alternative to a smartcard and smartcard reader.

The insert 50 provides users and remote clients with strong authentication for ensuring secure access to virtual private networks and secure computer network equipment. Through user identification data contained in each key, a secure network is able to grant or deny access according to the authorization level of each user. The insert 50 is small enough to carry on a key ring or the like for use as an access token for virtual private networks. Users need not memorize multiple passwords or jump through numerous security screens. USB is a new connect technology featured as standard equipment on desktop systems, servers, and portable computer devices currently being marketed.

Each insert 50 contains one or more encrypted references, which are unique to each user. Using this secret value, the insert 50 can compute a cryptographic response to challenges sent from the network. This method has significant security benefits over passwords. Specifically, the insert 50 computes a "one-way hash function" using the challenge and its encrypted reference as input. The insert 50 is secure and proves to the server that it knows the secret value, without ever revealing it. Even if malicious software is running in the client's workstation at the time of authentication, it cannot duplicate the insert's functionality at a later time. This proven cryptographic technique is now specified as part of the Internet Key Exchange standard protocol.

Either the prints of the thumb and index finger and the thumb can be captured and encrypted, or reliance can be placed on only the print of either. The index finger is preferred if a single print is used a larger print segment will generally result because of the grip 30 generally applied to a stylus 15.

Figure 3A:
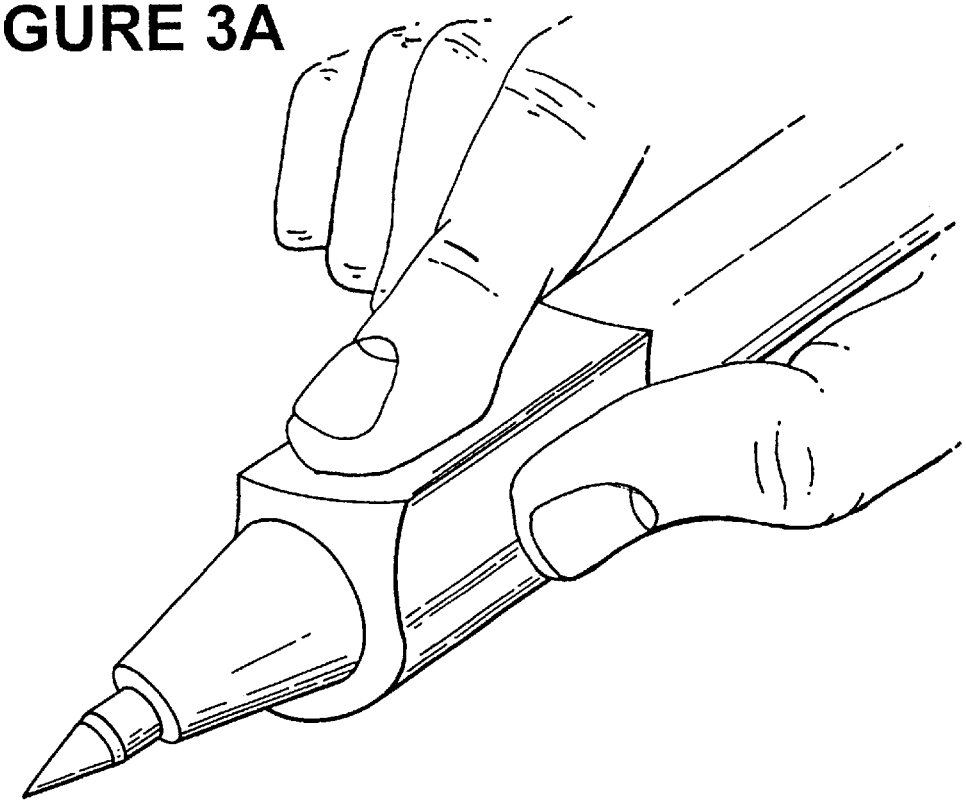
FIG. 3A discloses a preferred embodiment of the writing stylus with grip for use in the system of the present invention with a built-in grip.
Figure 3B:
FIG. 3B discloses the print images obtained from the print imaging sensors in the writing stylus of FIG. 3A.
Figure 3C:
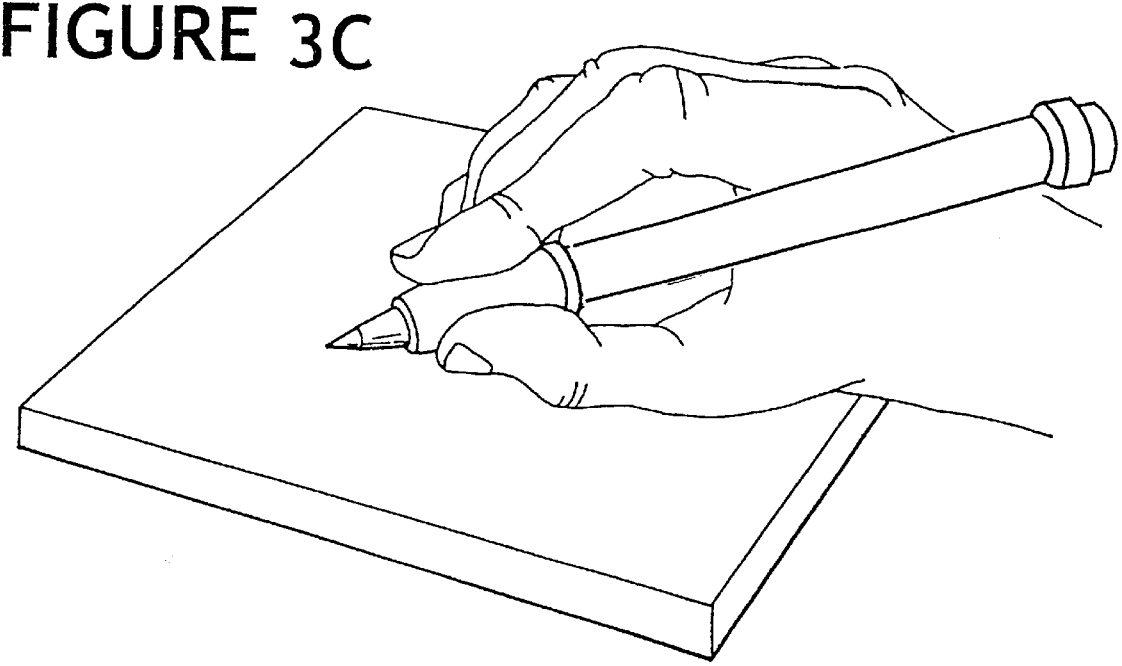
FIGS. 3C and 3D disclose additional embodiments of the stylus, the fingerprint sensor being disposed within an insert positioned on the click-button on the top distal end of stylus having a retractable point.
Figure 3D:
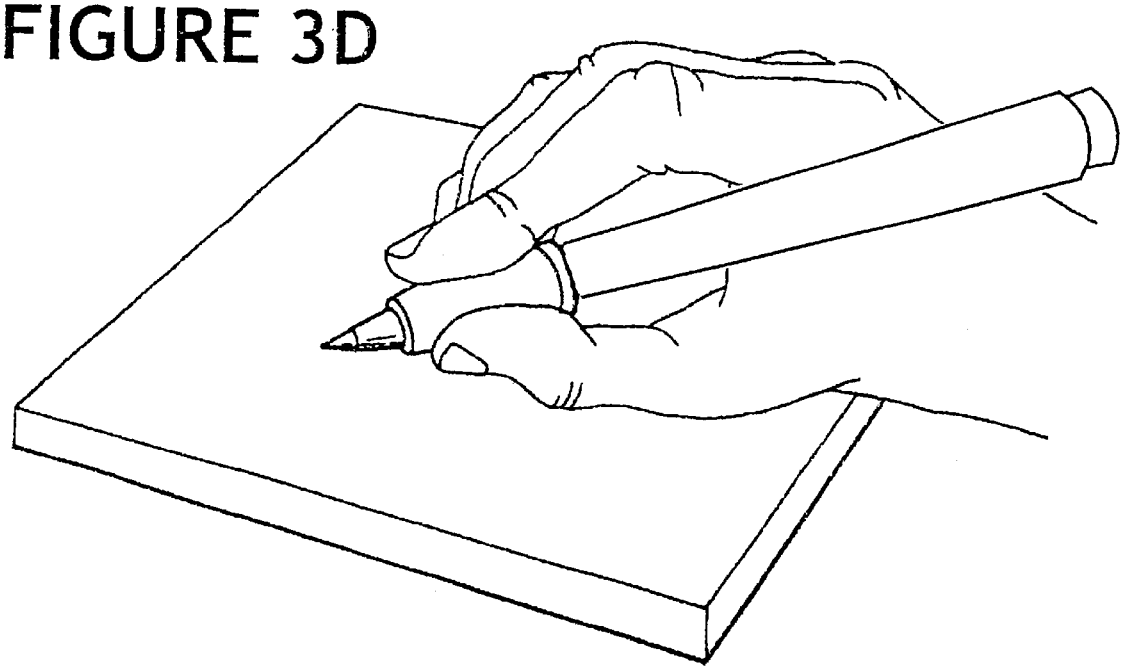

FIG. 3C discloses yet another embodiment of the stylus 15 of the present invention, the fingerprint sensor being placed in the top distal end of the stylus and tethered to the counter top. In order to release the stylus point from the stylus body, it becomes necessary to press the click button, where the stylus point is retractable and compatible with a digital surface. Since this clicking force is generally applied by the thumb, the captured print is compared with—a reference thumb print. The stylus point withdraws automatically after a predetermined period of time after each use.

The identity verification system of the present invention 10 is particularly useful in controlled environments. As used herein, unless the context suggests otherwise, a controlled environment is a community of people that: (1) requires registration to become a part of the community; and (2) where the purchase of goods or services occurs. Some examples of controlled environments include: hotels-resorts, luxury cruise liners, airports, banks, racetracks, bowling alleys, theme parks, hospitals, college campuses and public/private schools, military bases, hotel-casinos, sports complexes, shopping malls, and prisons. Once enrolled into the cardless transaction system of the present invention, any guest upon registration with the hotel complex has full and complete access to any amenity within the complex, at anytime, without carrying on his/her user anything other than biometric identification that is inherent in his/her being. As used herein a "controlled environment" does not require a single physical structure, but rather includes a network of related activities administered by a centralized driver. Some examples of these type controlled environments include a bank and its customers, a regional of drugstores, health club facilities, restaurants, or beauty salons and their customers.

Encryption registration systems are known in the art. U.S. Pat. No. 5,903,225 (Schmitt et al.) describes one method of encrypting a fingerprint into a card, and U.S. Pat. No. 5,623,552 (Lane) describes a self-authentication system enabling identity verification. The stylus 15 can be used for one-to-one matching without a master databank of biometrics or for one-to-many matching (1) a wireless stylus 15 is used at the terminal;

(2) match is confirmed internally between the user's print and the encrypted print;

(3) the stylus 15 is confirmed not to be a counterfeit;

(4) the encrypted reference print is checked to ensure that there has been no tampering; and (5) event access is enabled.

Figure 6:
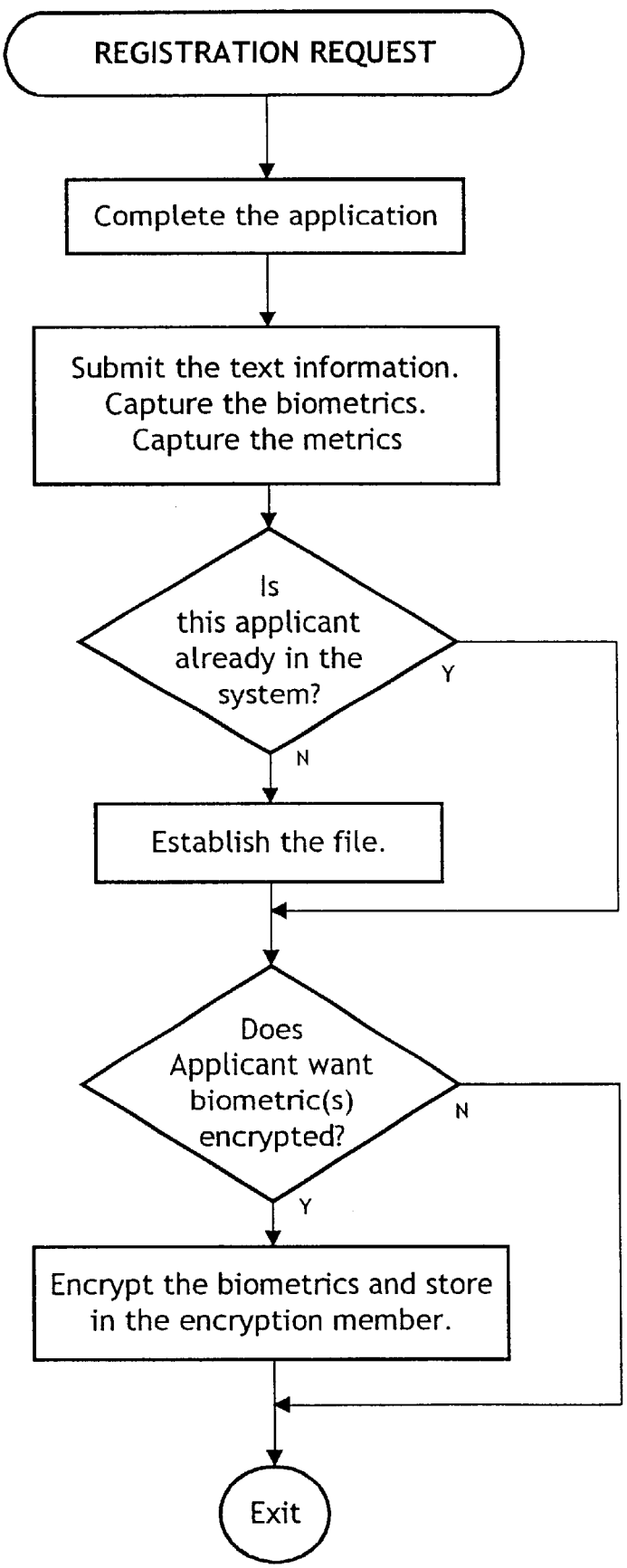
FIG. 6 discloses a simplified logic diagram of one embodiment of the identity verification system of the present invention, demonstrating how a user registers for participation in the system.
Figure 7A:
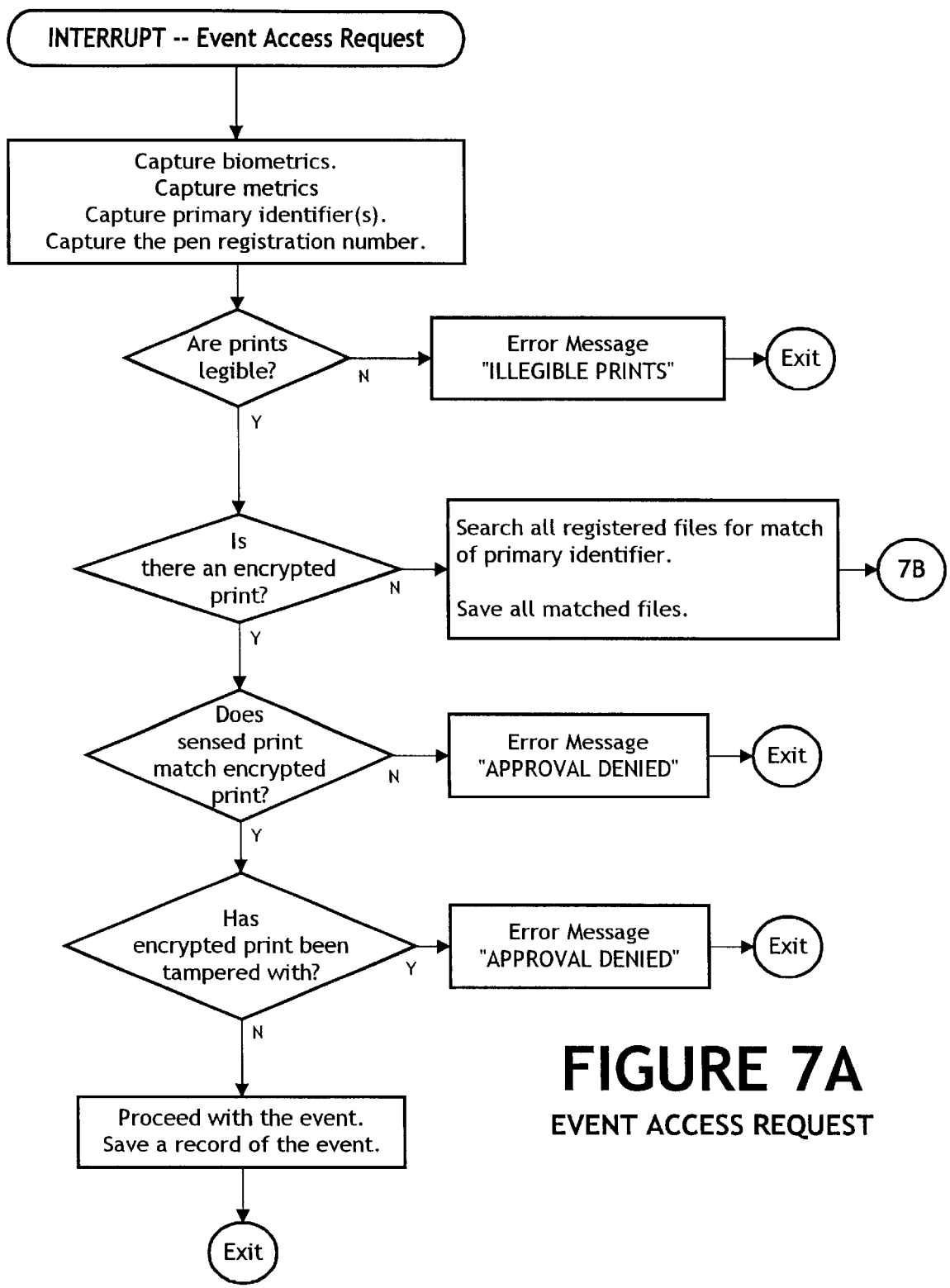
FIGS. 7A and 7B disclose a simplified logic diagram of one embodiment of the identity verification system of the present invention demonstrating how the user accesses an event in the system.
Figure 7B:
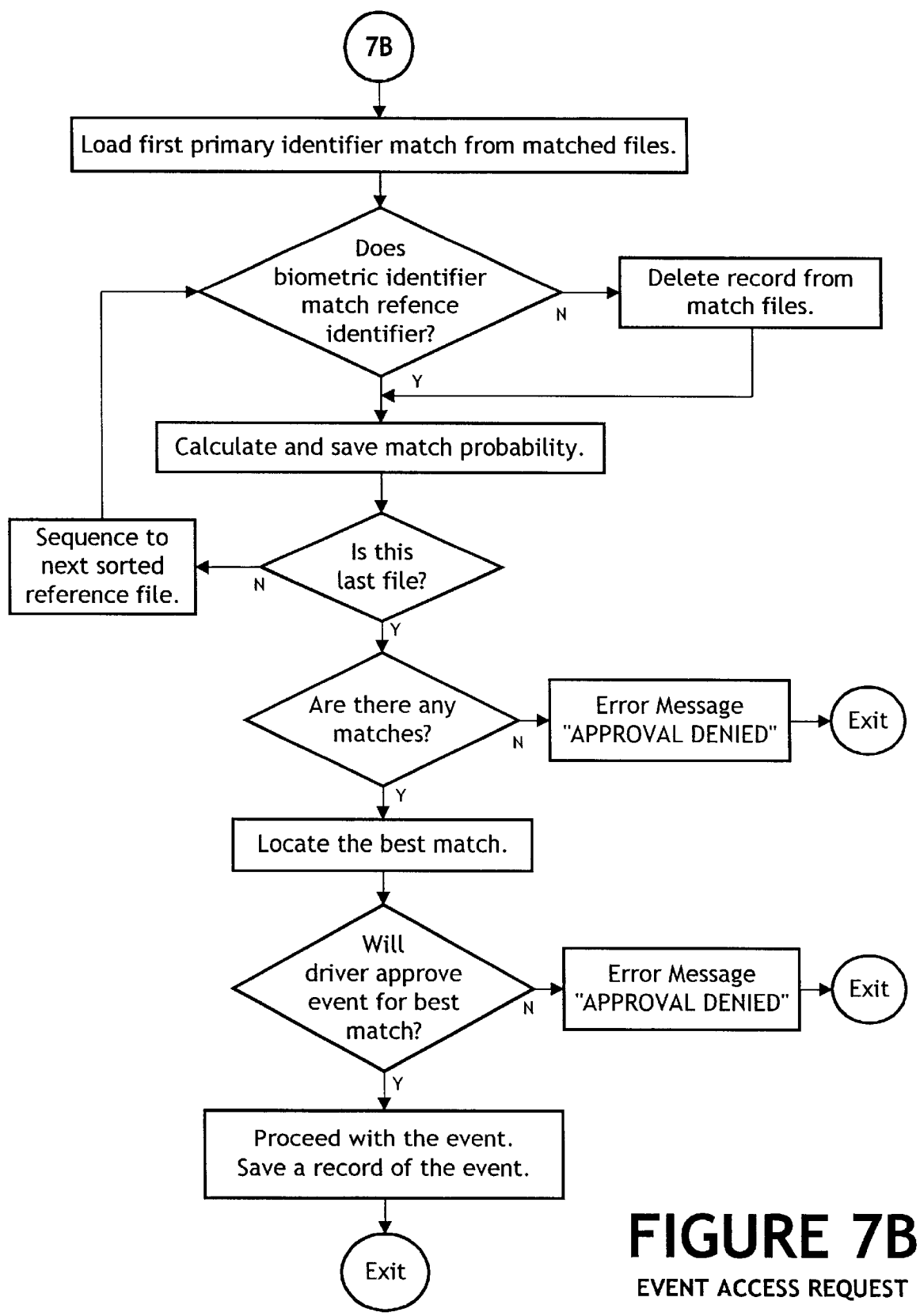

FIGS. 6A and 6B disclose a simplified logic diagram for registration with the identity verification system of the present invention 10. The user initially registers with a financial institution or POS terminal by signing his/her name with a special identical stylus 15 and exchanging legal tender to open the account. The account can be a debit account, a savings account, a checking account, or even a credit account. Later when the user wants to access the account to pay for goods or services, he signs his/her name with an identical stylus 15. Whenever the user wants to access the credit account at a POS transaction, an identical stylus grip 30 is preferably used, the user signs his/her name, and the computer searches through the appropriate files for purposes of comparison (see FIGS. 7A and 7B). When the biometric property is a fingerprint sensor, the size of the stylus 15 mandates that a smaller sensor be used, resulting in the capture of only a partial print. Accordingly, it becomes necessary that the stylus 15 includes guide means to ensure that the finger is positioned at the same site on the grip 30 to ensure that the same portion of the print is captured in each subsequent use. However, if a cell capture sensing method id used such as DNA, finger position on the stylus 15 is not critical so long as cell capture occurs and compared against a reference cell for matching.

In still another preferred embodiment of the identity verification system of the present invention 10 additional biometric sensors 20 are periodically added to the stylus 15 to provide the financial institution with all information that is necessary. So long as the additional sensors 20 do not affect the weight or balance of the stylus 15 so that fingerprint and signature biometrics are altered, no harm is done.

When registration occurs at someplace other than a financial institution, such as a POS terminal, the user pays legal tender to the merchant (a pre-paid or stored value type of account) who in exchange opens an account for the user. The financial institution is affiliated with the merchant, thereby enabling the user to open an account without ever having any bank affiliation. Such an account can be one where the user opts not to use fingerprints and selects a pseudonym for purposes of privacy as hereinafter described.

In one preferred embodiment of the identity verification system of the present invention 10, the sensors 20 capture the fingerprints of the index finger and thumb. The stylus 15 preferable has a special sensing grip 30 to fit the hand and enable a good reading of the thumb and index finger. The grip 30 is transparent. The stylus 15 is preferably portable and includes a sensor an optical or print imaging sensor. Once read, the images of the prints are captured for further processing. In one preferred embodiment, the biometric stylus 15 includes temperature sensors for purposes of activation. The sensors are well known in the art and are similar to the heat sensors found in elevators, the heat from the hand engaging the system.

In another embodiment, the point of the stylus is a conventional fountain stylus 15 that ensures that the orientation of the stylus 15 is aligned with the print sensors 20 disposed within the stylus 15. Preferably, a print sensor is disposed on the top surface of the stylus 15 and two additional sensors are disposed on the adjacent side surfaces of the stylus 15. This ensures repeatability of print images sensed.

For a right-handed user, the index finger is aligned with the point and the thumb is positioned on the stylus surface abutting the left-side of the stylus top surface. For a left handed user, the index finger is aligned with the point and the thumb is positioned on the stylus surface abutting the right-side of the stylus top surface. By capturing and comparing the index finger and thumb print of the applicant with the reference finger and thumb print, the likelihood of an error becomes highly unlikely. In the event that a biometric stylus 15 or grip 30 is not available, manual backup enables conventional identity confirmation. Accordingly, sensors 20 are positioned within the stylus 15 to read each of these prints.

The stylus 15 has a special sensing grip 30 to fit the hand and enable a good reading of the prints of the index finger and the thumb. The cross-section of the stylus 15 is generally rectangular with rounded corners, and the print surfaces for the thumb and index finger are slightly recessed and concave. FIGS. 5A, 5B, 5C, 5D, and 5E disclose various preferred embodiments of grip 30 configurations that are compatible with conventional styluses and pencils, the grip 30 including a cord connection to the writing surface, and sensors 20 being incorporated into the grip 30. FIG. 5E shows a teardrop configuration with the seam pointing upward. The applicant points the seam upward and places his/her index finger on one side of the seam and his/her thumb on the other side of the seam. This embodiment assures that only two sensors 20 are needed whether the applicant is right or left handed. Also, the combination concave-convex shape enables a larger portion of the two prints to be sensed by the print imaging sensors 20. FIGS. 3A and 3B disclose a U-shaped grip 30 and the images captured therefrom with the sensors 20.

In one variation, the biometric stylus 15 is tethered (attached) to a surface or counter by means of a plastic coated hollow tube, containing fiber optic cable therewithin. It is through the fiber optic cable that the print images are transmitted to the processor disposed within the surface or counter. The sensors 20 are disposed within the stylus 15. In another variation, the biometric stylus 15 is portable. While the sensors 20 are also disposed within the stylus 15, the signals of the prints are transmitted to the processor for conversion and storage. The prints of the thumb and index finger are preserved in the systems processor for as references for subsequent comparisons. The goods and service providers have a similar stylus 15 which is used by the guest to confirm identification and access the credit account.

Figure 4A:
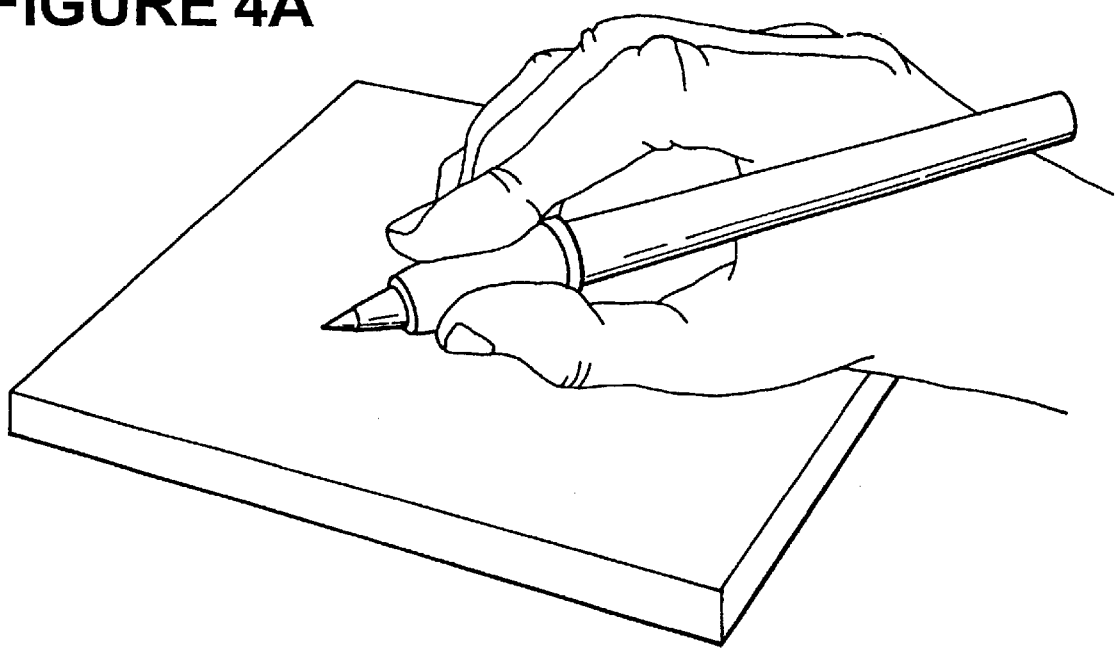
FIG. 4A discloses an assembly view of one preferred embodiment of the stylus of the present invention with the fingerprint sensor configuration in the top of the stylus.
Figure 4B:
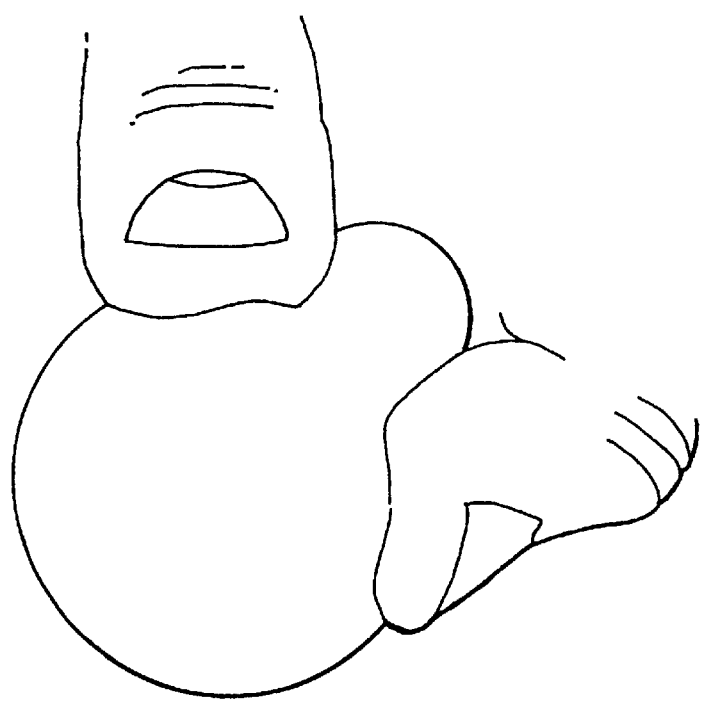
FIGS. 4B, 4C, and 4D disclose various grip configurations which provide alignment of the print sensors with the index finger and thumb.
Figure 4C:
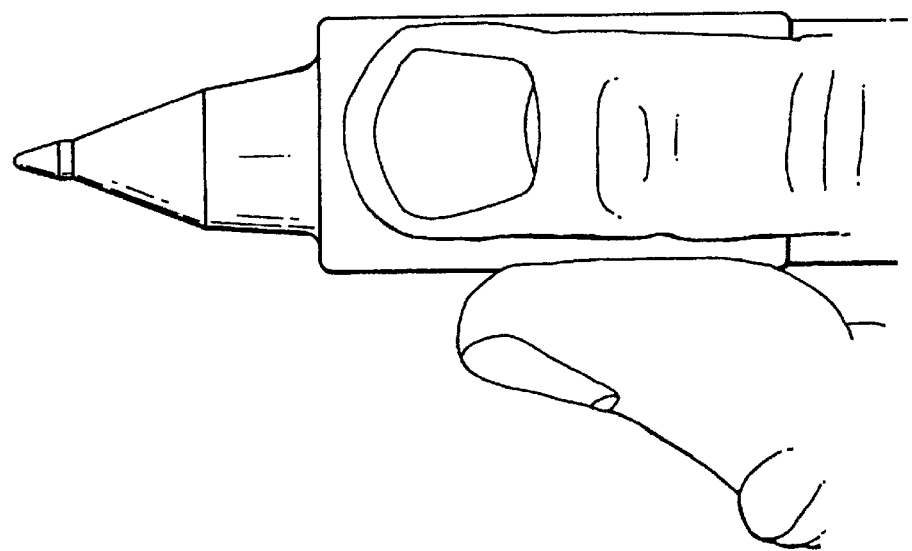
Figure 4D:
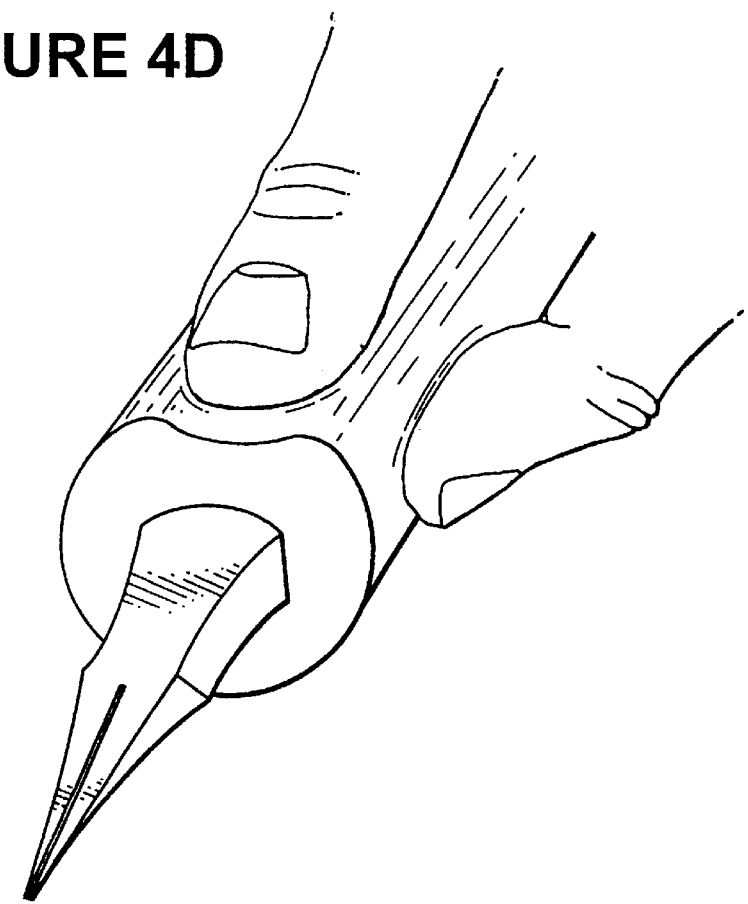

In another embodiment a grip 30 is provided that is compatible with conventional styluses and pencils, the print imaging sensors 20 being positioned within the grip 30. The grip 30 is symmetrical and preferably has a cubical shape with concave sidewalls. A power cord is affixed to the grip 30 to provide power to the sensors 20 and also to prevent theft. If the stylus 15 wears out or breaks down, it can be readily replaced with another conventional stylus 15, at a modest cost. Also, by having standard grip sizes, any problem with using biometric styluses of differing sizes which might change some of the properties of the biometrics are eliminated. The grip 30 configurations are designed to provide as good a reading as possible of as much of the index finger and thumb print as possible. Certain preferred embodiments include concave cubes (see FIG. 4C), an enlarged cylindrical chamber section (see attached drawing). The grip 30 is preferably transparent and is designed to be self-aligning, that is, the user must grasp the grip 30 where the sensors 20 are located to use the stylus 15. FIG. 4B is self-aligning using a lip that eliminates the need for a third sensor to accommodate both left and right-handed people. FIG. 4D discloses a fountain pen type stylus which is self-aligning because of the orientation of the stylus tip.

Also, the power unit of the stylus 15 can be incorporated into the body of the stylus 15, making the stylus 15 portable and self-contained. In the other primary embodiment, the stylus 15 is affixed to the tablet counter to prevent theft. The stylus 15 includes a print imaging sensor configuration, as the signals of the prints are transmitted for processing. The fiber optic cable transmits print images to a processor. The processor is positioned within the surface/counter. The stylus 15 includes a sensor configuration for capturing one or metrics and/or biometrics.

For transactions involving a larger pools of potential users, processing strategies are needed so that the system need not continually process millions of files to confirm or deny access. One main purpose of a credit-type card is to provide a primary identifier for file searching purposes. When the identity verification system of the present invention 10 has widespread global acceptance, it will become necessary to distinguish the user from hundreds of millions of other people. It is not practical to have the driver search such numbers of records for each transaction.

The primary identifier in a conventional credit card transaction is any one of the following: the imprinted name; the imprinted PAN; or the information stored in the magnetic stripe (smart card).

To replace a card, the replacement system also preferably includes at least one primary identifier. Examples of primary identifiers comprise birthday (6 digit code), zip code, PIN, or printed name. There is a preference for numerical data because of language and translation problems, since Arabic numbering is essentially the global standard.

Certain basic strategies are needed. Since the fingerprints enable determination of whether the user is right or left handed, records of people that don't match the hand of the user are discarded immediately during processing. In one preferred embodiment, the signature is the first biometric processed (when fingerprints are not used). The print of the index finger and thumb are the next biometrics used. If either or both cannot be read, the user is so advised and the transaction is rejected. If the prints are of good quality, each is checked as against the remaining records in the pool of registered records. The prints of each transaction are preserved and used to develop an improved composite of the user's prints for subsequent transactions.

In one preferred embodiment, a numerical is used (see FIG. 10) t6 streamline the confirmation process. The user enters a zip code or perhaps a PIN which is checked prior to the signature. The zip code is preferred in instances where the clientele is national or international, whereas a PIN is preferred for instances where the transaction is regional.

There are two basic type of card transaction that the principles of the identification system of the present invention 10 are of particular applicability to:

Credit transactions where the user needs to identify himself/herself so that the institution can determine credit status for purposes of advancing credit. It is critical that exact identity be made at time of registration so that credit histories can be properly accessed and analyzed; and Prepaid or stored value type of transactions where the user has deposited an amount of money for subsequent use.

In one preferred embodiment of the present invention, the exact identity of the user can be withheld in prepaid or stored-value transactions. In one preferred embodiment of the present invention, the stylus 15 includes an on-off switch. In the off position, the fingerprint sensors 20 are not used, so that the confirmation is done without sensing the fingerprints. In this embodiment, the signature becomes the primary biometric. If the user signs a pseudonym rather than his/her regular name, withholding his/her actual name, the system processes the transactions without knowing the user's actual name or his/her prints. As long as the pseudonym is used to access the account, anonymity is assured while using the identification system of the present invention.

The same result can be achieved by having two separate styluses, (1) a stylus 15 which includes print sensors 20 for transactions where privacy is not the primary concern; and (2) a stylus 15 without print sensors 20 for stored value or prepaid accounts. In yet another preferred embodiment, the print sensors 20 are incorporated in the grip 30, and the grip 30 is removed when the fingerprints are not to be used. The only thing that is necessary is that the individual be able to access his/her account, so that the system provides near perfect repeatability. Of course the user will need to remember the alias used to access the account. This is particularly attractive feature to those people with concerns about individual privacy, since they may participate in blind transactions while using the stylus 15. The users can obtain print-outs of monthly statements by going to a special terminal and verifying his/her identification with a biometric stylus 15 and thereafter requesting such information.

The identity verification system of the present invention 10 comprises biometric registration upon entry into the complex, biometric access to a guest room, biometric play of slot machines, biometric play at gaming tables, and biometric purchases on-site within the complex such as restaurants, lounges, boutique shops, and the like.

A guest to register upon registration with the hotel complex confirms his/her identity upon arrival and check-in, selects an amount to be entered into an account, enters biometric identifiers that are to be used on-site during his/her stay. Thereafter whenever the guest seeks access to his/her room or access to the account, identification is confirmed by matching the biometric identifiers and the guest can participate in amenities offered within the complex. The biometric identifiers are preferably prints of the index finger and thumb. The stylus 15 is preferable a stylus which has a special sensing grip 30 to fit the hand and enable a good reading of the thumb and index finger. The stylus 15 is preferably portable and includes a sensor an optical or imaging print sensor. Once read, the signals of the prints are transmitted for processing. The guest can add value to his/her account at terminals throughout the casino.

The system enables a guest to make any on-site purchase, at a restaurant, lounge, boutique shop, or the like and access the balance for use in the complex. The guest grasps a biometric stylus 15 similar to the implement used at registration to enter the print of the index finger and thumb. A fingerprint sensor reads the thumb and index-finger print from the implement and seeks a match with all registered prints in the system. Once identification has been confirmed, and the available credit balance in the guest's account is sufficient to cover the purchase, the purchase is made and the account balance is decreased by the amount of the purchase.

Transactions where the pool of potential users is under 50,000 people include controlled environments like resorts, hotels, colleges, dormitories, theme parks, prisons, cruise liners, and the like. For this volume of registrants, the primary identifier is not needed, but if used, does improve transaction time and system efficiency somewhat.

Figure 8:
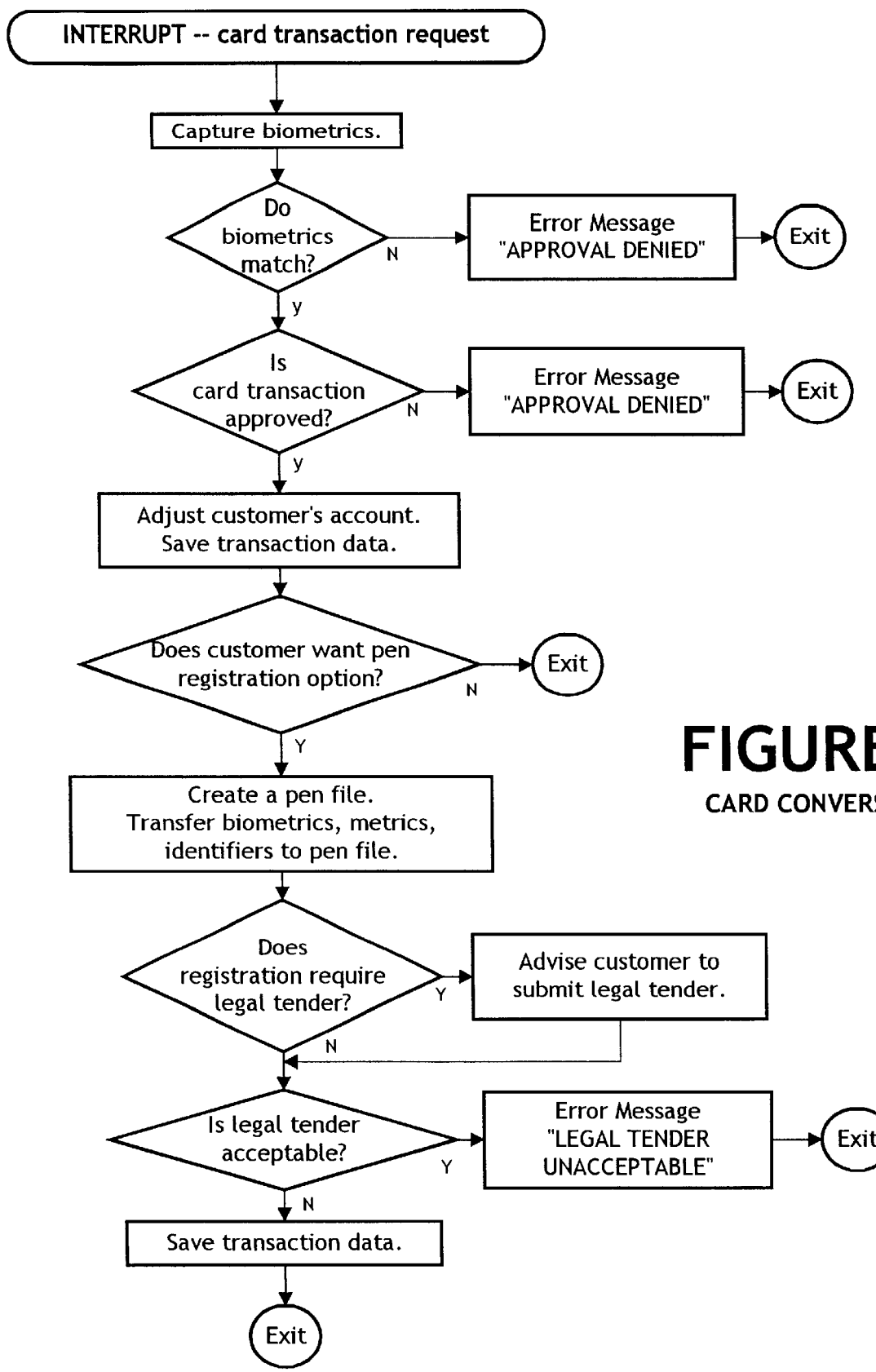
FIGS. 8 discloses a simplified logic diagram for use with the identity verification system of the present invention, enabling a user to convert from a card-based transaction system to a pen-based transaction system without the need for any cards in subsequent transactions.
Figure 9:
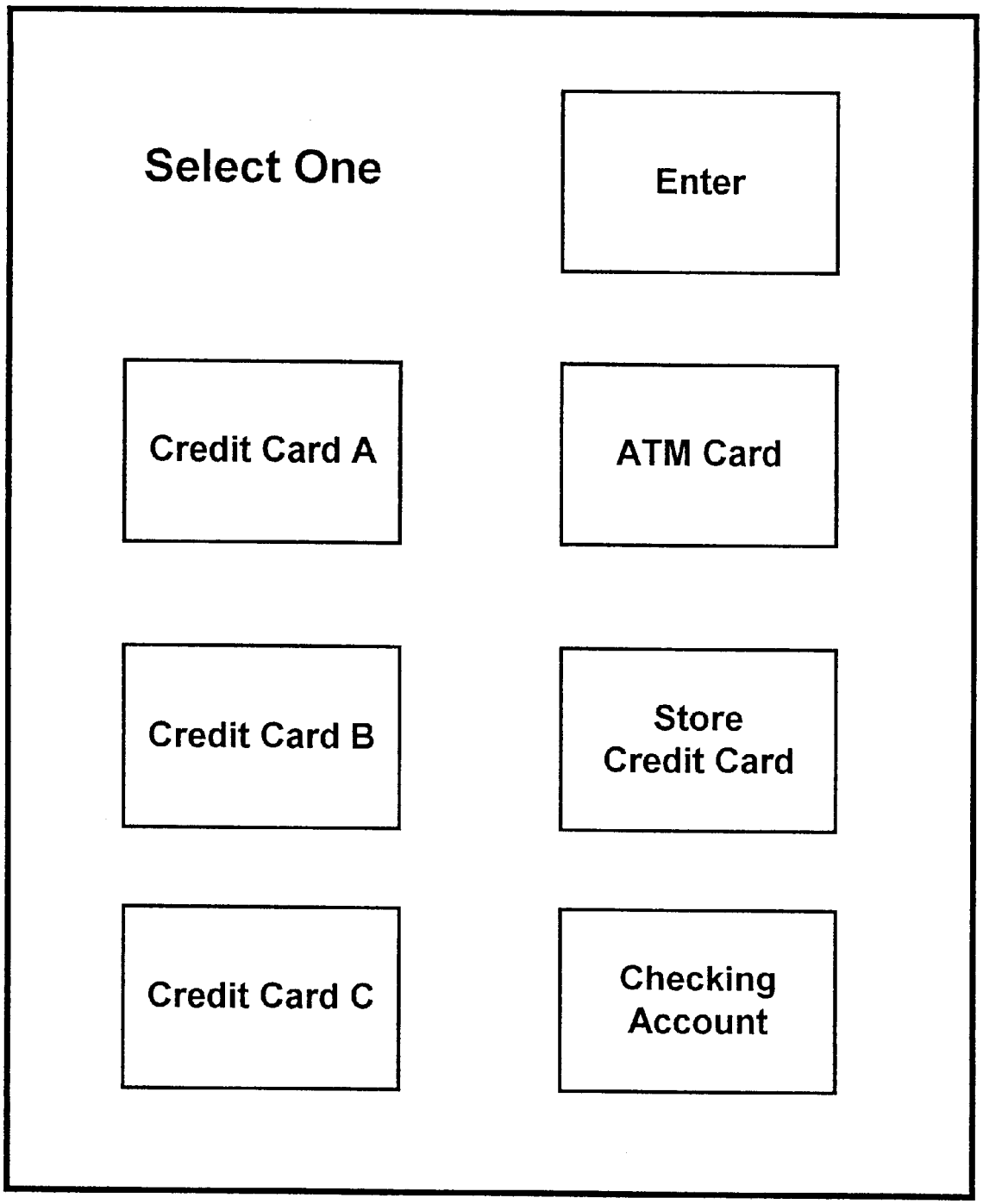
FIGS. 9 discloses a payment selector used by a user to select which account the transaction is to be paid from in another variation of the identity verification system of the present invention.

The identity verification system of the present invention 10 enables a credit card holder to convert the account to use with the biometric stylus 15 (see FIGS. 8 which discloses a simplified logic diagram). The conversion process enables the cardholder to conduct either card-based transaction, pen-based transactions, or their combination. Upon signing with the stylus 15, the system driver accesses the user record for the cardholder and creates a duplicate record in the identity verification system of the present invention 10. Thereafter, the cardholder transfers legal tender from his/her card credit balance to the new account. FIGS. 9 discloses a payment selector enabling a user to select which account the transaction is to be paid from in another variation of the identity verification system of the present invention 10.

A credit cardholder can also set up a new account at a POS terminal by use of his/her card. The cardholder swipes his/her card through a cardreader and signs and prints his/her name using the biometric stylus 15. The biometrics are captured and the cardholder advises the credit card financial institution of the amount to be transferred to the new account. Account information is exchanged and the card is no longer needed.

A variety of digitizing inscription pads are known in the art. U.S. Pat. No. 5,652,412 (Lazzouni) discloses an apparatus for reading and storing coordinate information representative of the instantaneous position of a stylus on a writing surface. The system provides a writing paper having a prerecorded pattern of pixels, each pixel containing encoded location information which identifies an absolute and unique coordinate location on the paper. The system enables the simultaneously recording of written information on encoded paper and for recording the written information in a memory. Also, U.S. Pat. No. 5,263,742 (Koch) discloses a fingerprinting system where the print is developed by making a copy on a sensitized surface by back reflecting radiant energy through an adhesive where the print is imaged. Similarly, U.S. Pat. No. 5,709,746 (Ballard) discloses a self-contained fingerprint kit.

While the biometric stylus, signature, and other biometrics that can be captured by the combination stylus 15 and digitizing inscription pad are sufficient to distinguish the user from hundreds of millions of others, an efficient search strategy is needed.

While there has been considerable development of technology of improved sensing systems for signatures, the signature will never be the biometric of choice in the identity verification system of the present invention 10 since handwriting and signatures change with time and with each writing such that a match with perfect confidence is not possible. However, the signature is needed for legal purposes, so that it will always be needed to include some sort of signature verification into any identification system.

The biometrics needed are all provided by the stylus 15. The primary biometric is the print of the index finger, and the thumb print being the other primary biometric. Some examples of metrics include stylus point pressure, stylus grip pressure, accelerometers, gyroscopes, position of index finger, position of thumb relative to index finger. Also, a timer is extremely useful in measuring biometrics associated with signature. The timer is useful in determining acceleration and deceleration, the time needed to sign the name, the time spacing that the stylus 15 is lifted from the digital surface, and first name time, middle initial time, and last name time.

Alphanumeric data for the primary identifier can be provided by (1) a digitizing inscription pad, (2) a mouse and CRT, (3) a touch sensitive CRT, (4) voice and speech recognition, (5) a keypad embedded in the writing surface, and (6) the stylus. In applications involving larger populations, one preferred embodiment includes multiple identifiers to speed up the system processing time.

Financial institutions benefit in that credit card fraud is eliminated. The Identity verification system of the present invention 10 is virtually impregnable to criminals. The financial institution controls the entire transaction, since they capture and process as many biometrics as necessary before deciding whether or not to approve. Merchants and users also benefit since consumer fraud costs are often passed onto them. Fingerprints are recognized all over the world as positive proof of identity and are the key to the system. Each finger contains up to 100 different points of distinction which never change with time. Merchants benefit in that the transaction time is minimized. The identity verification system of the present invention 10 system minimizes the time between when the user signs his/her name and when the transaction is approved. The system automatically captures the fingerprint data when the user signs his/her name and processing begins immediately. Any transaction that does not involve cash requires a user signature anyway—his/her obligation to pay. Users also benefit from improved transaction efficiency by not having to wait in slow-moving lines. Users benefit in that all cards are eliminated. Cards are easily lost or stolen, signatures are easily forged and PIN's are readily determined by criminals. While cards are easier to carry than money, they are almost as negotiable as money to sophisticated criminals. The identity verification system of the present invention 10 system provides maximum security and safety for the user by eliminating the need to carry all credit cards, debit cards, ATM cards, stored value cards, and pre-paid cards in a wallet or purse.

As shown in FIG. 2A, the identity verification system of the present invention 10 uses a biometric stylus 15 that has print imaging sensors 20 positioned within the unique grip 30. Electronic images of the index finger and thumb are extracted during user registration. Thereafter, an applicant uses a similar stylus 15 to submit a set of prints for comparison with the set of prints of the authorized user—the prints either match or don't match. The use of two prints makes a mistake highly unlikely. The stylus 15 will thwart forgers since the content of the writing is unimportant. The stylus 15 is provided by financial institutions, POS terminals, and government agencies worldwide.

In one preferred embodiment, the principles of the biometric stylus 15 can be combined with signature verification technology to identify the applicant and the writing content. Also, since prints of the index finger and thumb of the writing hand are the most common biometrics, once captured the prints can be used for comparing other types of touch contact (e.g.—a keypad). In another preferred embodiment, a digitizing inscription pad is used, and the position of the stylus 15 relative to the surface enables determination of the written text. An optical sensor in the writing surface captures the signature or the writing to be used in combination with the prints. Alternatively, the system includes a keypad in the writing surface for the user to enter a PIN instead of the optical sensor or in addition to the optical sensor.

Registration in the identity verification system of the present invention 10 is similar to opening a new bank account. An application provides the financial institution with basic information—name, address, phone number, and signature. The only difference is that a special stylus 15 is used that enables the financial institution to capture certain data while the applicant signs his/her name. These biometrics include prints of the index finger and thumb, and point and grip pressure.

The account can be accessed at any POS terminal. The user signs and prints his/her name using a biometric stylus 15 that's identical to the stylus 15 used during registration. The biometrics are again captured and compared to the biometrics of all registrants in search of a match. The financial institution then confirms that there are sufficient funds in the account, deducts the amount from the account, and approves the transaction.

A credit cardholder can also set up a new account at a POS terminal by use of his/her card. The cardholder swipes his/her card through a cardreader and signs and prints his/her name using the biometric stylus 15. The biometrics are captured and the cardholder advises the credit card financial institution of the amount to be transferred to the new account. Account information is exchanged and the card is no longer needed.

Automated systems evaluate the fingerprint features by showing the coincidence of the minutiae features, taking into consideration the similarity, number, and unit relationship of the characteristics to each other. Searching and matching of fingerprints is accomplished by assigning each minutiae point a position on an x/y coordinate, a direction of flow, and relationship to other minutiae. If a user has to use a stylus 15 anyway to verify a commercial transaction, why not use sensors 20 in the stylus 15 and writing surface to confirm identification (forget about the plastic cards).

In still another preferred embodiment of the identity verification system of the present invention 10, other sensors are added to the stylus 15, as necessary, to tighten security and reduce fraud—including a pressure sensor to measure point pressure; another pressure sensor to measure grip pressure; an accelerometer to the stylus point to measure stroke speed; a gyroscope positioned at the top end of the stylus 15 to measure the angle of the stylus 15; a heat sensor in the stylus grip 30 to measure position of the index finger relative to the point; and a position sensor in the stylus grip 30 to measure the position of the thumb relative to the index finger. Additional sensors include measuring the speed of the signature, the user's finger temperature, and so on. While all of these biometric identifiers are subject to minor variations, the financial institution checks as many as needed until it is satisfied that the user seeking entry is authorized to access the account.

In a perfect system, the user who is entitled to entry will always be enabled entry, and all others will always be blocked. Hence, in addition to primary identifiers and biometrics (primary and secondary) other demographic information is analyzed when the decision of identity is in doubt to assure that the system of the present invention 10 operates in a near-perfect manner. Such demographic information includes the location of the transaction request relative to the primary residence of the registrant, the frequency (if ever) that the registrant has ever engaged is such transactions, and whether or not the registrant has made other transaction during the past 24-hour period and where such transactions are located.

In yet another embodiment a grip 30 is provided that is compatible with conventional styluses and pencils, the print imaging sensors 20 being positioned within the grip 30. The grip 30 is symmetrical and preferably has a cubical shape with concave sidewalls. A power cord is affixed to the grip 30 to provide power to the sensors 20 and also to prevent theft. If the stylus 15 wears out or breaks down, it can be readily replaced with another conventional stylus, at a modest cost. Also, by having standard grip sizes, any problem with using biometric styluses of differing sizes which might change some of the properties of the biometrics are eliminated.

Some primary applications for the identity verification system of the present invention 10 include identification for (1) Drivers' license registration and verification; (2) Voter registration and confirmation; (3) Law enforcement; (4) Credit card verification; (5) All banking transactions; and (6) College and high school students for applying for financial aid and to confirm test-taker identification.

In still another embodiment of the identity verification system of the present invention 10, the biometric stylus 15 is combined with one or more primary identifiers to authenticate identification to replace credit, debit cards and the like. The primary identifiers include phone number, name, area code or zip code. The system performs the initial search based upon the primary identifier(s) to reduce the size of the universe. Then identity is either confirmed or denied based upon the prints. In another preferred embodiment, additional biometric sensors are used in addition to the fingerprints.

One example of the use of the identity verification system of the present invention 10 is in a hotel casino complex. The system of the present invention comprises biometric registration upon entry into the hotel-casino, biometric access to a guest room, biometric purchases on-site within the complex such as restaurants, lounges, boutique shops, and the like, and biometric play of slot machines, biometric play at gaming tables.

The biometric identifiers are preferably prints of the index finger and thumb and are sensed by means of a stylus 15. The stylus 15 is preferable a stylus 15 which has a special sensing grip 30 to fit the hand and enable a good reading of the thumb and index finger. The stylus 15 is preferably portable and includes an optical or print imaging sensor. Once read, the signals of the prints are transmitted for processing. The guest can add value to his/her account at terminals throughout the casino complex.

When one uses a stylus 15, it is generally grasped by the index finger and thumb for purposes of writing on a flat surface. The stylus 15 includes two adjacent flat surfaces which are specifically configured to optimize the completeness of the prints taken. If the guest is right-handed, the surface used to read the index finger is to the right of the second surface. If the guest is left handed, the surface for the index finger is to the left of the second surface. In both instances the second surface is used to read the guest's thumbprint. Accordingly, sensors 20 are embedded within the stylus 15 to read each of these prints.

A distinction is made between applications involving the matching of prints of the guest requesting access as against a limited number of authorized entrants (guest room access) and those applications where the prints of the guest requesting access are compared against a large number of guests in the system (slot and table play in a casino). While both instances require a comparison with known authorized entrants, the former comprises a much smaller pool and processing is greatly simplified. In the latter, the central processor needs to process a considerably more data, and search strategies are used to streamline the search.

For example, in applications involving slot machine access, the search compares the prints of the player seeking entry with all registered guests. Initially, the prints of the guest seeking entry are compared with the player who last played this slot machine. Absent a match, the prints are compared with other players playing adjacent machines. Absent a match, the prints are compared with all players in the general area within the last few minutes. Eventually, the pool is expanded until all registered guests have been screened for a match. To improve efficiency, the prints can be sorted by types and styles that are well known in the art. The pool is gradually expanded in logical incremental steps. With each gradual expansion, previously checked prints can be dropped so that they are not rechecked. This area is continually expanded until a match is found or the search has been completed.

The identity verification system of the present invention 10 is readily adaptable to off-site purchases and other applications involving the telephone or the keyboard of a computer (not shown). It often becomes necessary to confirm positively the identity of the user on the other end of the telephone. For off-site purchases by phone, it is important to confirm the identify of the user making the purchase. Also, many phones now have caller ID where the user receiving the incoming call can read the caller's phone number before answering the call. If the caller uses the engagement member of the present invention, the user receiving the call can also identify the caller.

For the handle or handset of a telephone, the primary prints are the thumb, the index finger, and the middle finger. In another embodiment, the optical sensors can also be positioned relative to any of the digital keys on the phone and confirm identification. This approach is useful in applications involving a smaller pool of possible users since only one print is read.

Figure 10:
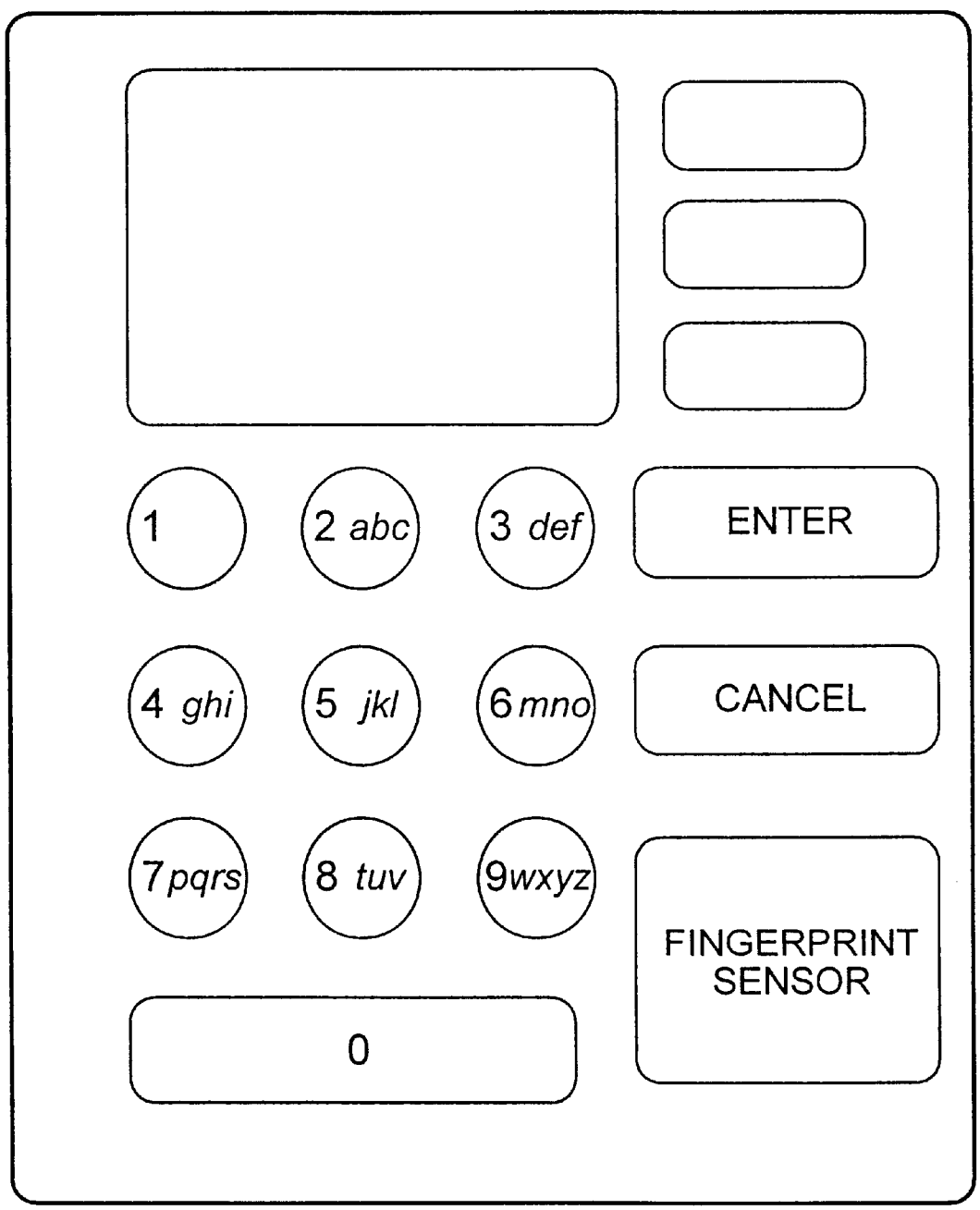
FIG. 10 discloses a keypad for use with a digitizing surface to enable data entry such as a primary identifier for use with the identity verification system of the present invention.

The identity verification system of the present invention 10 when used in applications involving keypads and computer keyboards includes a modified keyboard with the sensors positioned either relative to an existing key or a special biometric push button having a recess to enable a three-dimensional print (see FIG. 10). When one or more keys are pressed, the prints of the user are read to confirm that entry is authorized.

The optical sensors can also be positioned relative to any of the digital keys on the keyboard and confirm identification. A smaller pool of users is needed since only one print is read. However, keyboard sensors can be useful in instances where the caller's phone number is read and there are only a limited number of people authorized from that number as with a modem. Also, keyboard sensors can be used in combination with PIN's to provide increased security.

Preferably, multiple biometric prints are used to confirm identification. Secondary biometrics include not only fingerprints, thumbprints, and palm prints, but also speech and voice recognition, and facial readings (retinal scans, infrared facial readings, feature spacings, and the like). For example, to enter a guest room, a parallel system may include a recorded message asking "Who's there?" The response is recorded through a speaker and voice recognition is used to identify the speaker. Speech recognition can also be used to monitor the content of the response. Also, facial imaging scanners are disposed within the doors to guest rooms and in overhead cameras with mirrors in the casinos for use as secondary biometrics. All unauthorized biometric prints can be preserved for law enforcement purposes to assist in identifying and convicting burglars and thieves.

The system is also applicable to resort hotel complexes that do not include slot machines, tables gaming, and other type of gambling activity. Similarly, the principles of the present invention are also applicable to standalone casinos that do not have guest rooms. Registration can occur for a standalone casino either off-site with pre-authorized third parties or with the casino.

A debit variation of the system of the present invention provides improved user convenience for debit, pre-paid, and stored-value type transactions. No credit is extended to the user, who pays for his/her account in advance. This variation opens the financial system to everyone, regardless of credit rating, class, or legal standing. The user does not need bank affiliation, since the account is assigned to a system financial institution if none is designated.

The debit variation is initiated at any POS terminal, ATM, or financial institution by transferring cash, checks, money order, or credit cards into the account. Since credit is not being extended to the user, less information is needed. Registration occurs directly with a financial institution, or with the stylus 15 of the present invention during a debit transaction at a POS terminal (similar to the system of the present invention). The debit variation also provides anonymity in certain types of transactions. When the size of the participating group is limited, such as in a controlled environment (hotel, amusement park, etc.), a stylus 15 can be used without the fingerprint sensors 20. If the user selects a pseudonym, authentication is confirmed by the signature and the other biometric sensors 20 in the stylus 15. Absolute identity is protected without the prints and without disclosing a true identity.

Many retail outlets no longer accept checks because of fear of forgeries. A check confirmation variation of the system of the present invention 10 provides the perfect way to authenticate identification at a POS terminal. The user registers with the stylus 15 of the present invention when opening his/her checking account. When writing a check, the financial institution is identified and approves the transaction. The system also ensures against overdrafts. Signature verification for checks is an added benefit for POS terminals that provide the system of the present invention 10. This check authentication program can also replace conventional checks. The identity verification system of the present invention 10 provides user authentication, access control, and personal accountability to provide—as an example—use by the pharmaceutical industry.

Calm technology is the name that has been assigned to the third wave in computing, which is just now beginning. Mainframes, where each computer is shared by many users is the first wave. We are currently in the second wave of the personal computing era, where user and machine stare uneasily at each other across the desktop. In calm technology, the technology recedes into the background of our lives. These computing devices are unobtrusive and provide seamless access to a wide variety of data and allow the user to perform tasks as needed, where needed. Calm technology moves interaction with computers out of a user's central focus and into the user's peripheral attention where they can be used subconsciously.

People are becoming more and more mobile and are requiring access to the Internet, various other systems, data, and software. Systems have already evolved that require users to be "connected" wherever they go all the time. Individuals want to take the same tools and data they have at their desks wherever they may go. In addition, they want to access a variety of information from wherever they or the data is located. Access to such data must be secure.

Reliability and security are also important and necessary for mobile computing to be useful. Accordingly, the mobile user must have reliable access from anywhere at any time. While connected to systems and retrieving or transmitting data, security is at times extremely important. Secure connections may not be necessary when browsing the news on MSNBC, for example, but are highly desirable when connected to corporate databases or when electronic commerce is undertaken.

The mobility of the user requires options other than a mouse and keypad for data entry and network access. The size of the screen makes it impractical to use touch-screen technology. A stylus is currently being employed in many of these applications. The stylus is particularly useful for accessing screens and menus. FIGS. 17A, 17B, and 17C show various types of mobile computing devices using pen-based technology, including (a) a lap-top computer, (b) a palm-type computer; and (c) a hand-held computer, respectively. The identity verification system of the present invention 10 enables the network to confirm user identity prior to access to each menu or screen. This is a major improvement over a fingerprint sensor in the keypad to confirm identity during log-on.

When one is "mobile" and using a computer to perform various tasks and access data, connecting to remote sites is simple and as transparent as possible. Using notebooks and PDAs (with Windows CE), the user remains connected to any number of systems while in remote locations.

Current mobile hosts such as notebooks, PDAs and cellular phones provide connectivity but lack interconnectivity. With these devices a user connects to another system on a point to point basis. Using calm technology become aware of each other and know how to exchange information among themselves. In addition, they become able to control each other as needed.

Security is no longer an optional network component. Today organizations of all sizes are discovering the need to protect their networks from both external and internal unauthorized users. In the days before remote access, organizations had controlled, hard-wired networks, which provided physical security. Network access was limited to users physically located in the building. Requiring users to type in a name and password added another layer of security to the network. Providing remote network access has added an entirely new dimension to the problem.

The integrity of any system is compromised when any of the following occur: (1) confidential information is available to unauthorized parties; (2) the user's identity is not continually authenticated; (3) information content is corrupted when the information is not received as originated; (4) the user can deny the communication; (5) access control to resources is not controlled by authorized parties; and (6) data resources are not available to authorized users when needed.

The identity verification of the present invention 10 provides network access security by; (1) controlling unauthorized access to the network; (2) controlling improper access by network users; and (3) monitoring of user access to network resources. The pen-based computing network initially identifies the user, and continually controls and monitors user activity while the user is plugged in.

Two additional applications of the identity verification system of the present invention 10 involve (a) smart-pens; and (b) electronic commerce. The principles of the present invention are completely compatible with smart-pen technology. The miniature technology, which integrated sensors, mouse, digital signal processor, radio transceiver and encryption software in an actual stylus 15. Smart-pen technology captures the written text generated by the stylus 15 for subsequent use. The device looks and works like a big stylus 15 but is actually a miniature computer system. Hence, the stylus 15 of the present invention confirms user identity during normal usage of the stylus 15 and the smart-pen technology captures the content of the written text onto any surface. The smart-pen technology is particularly useful for students taking notes in class, writers, and management staff—the paper need not be preserved.

The smart-pen is a wireless stylus 15 that writes on regular paper but is connected to the computer. The smart-pen measures speed, and acceleration forces in three dimensions, and calculating the data. The smart-pen feels and looks just like a real pen. Assuming the writing surface to be a fixed plane, as the smart-pen writes, the stylus tip will travel through three-dimensional space near the paper. The tip of the stylus 15, as calculated, is a three-dimensional curve lying around the writing surface. The curve is projected on that plane representing the stylus tip's path along the paper, this path is the written text, incorporating unique characteristics of the writer. Therefore signature verification with the smart-pen does not depend on the graphic image of the signature but on the dynamics of the act of signing. The dynamics are strictly personal and thus allow the authentication of the signer.

The identity verification system of the present invention 10 also provides a safe and attractive alternative to electronic commerce, particularly over the Internet. By authenticating the author of a transaction, the act becomes undeniable. The advanced micro mechanics and micro electronics built into the stylus 15 enable the usage of a regular pen as biometric input device. The stylus 15 can be used to make Internet transactions or bank transfers secure, because it unequivocally authenticates a user. In order to increase its user friendliness, simple pen functions are incorporated within this miniature computer.

The ease and the low cost of transactions over any network, make the stylus 15 of the present invention an ideal payment device and an excellent device for buyers: sales channels, Internet channels and virtual shopping.

By authenticating the author of a transaction, the act becomes undeniable. The advanced micro-technology of the smart-pen, enables the usage of a conventional stylus 15 as a biometric input device. The stylus 15 provides identity verification for numerous electronic commercial transactions including:

a) Privacy protection for medical records and telemedicine;

b) Trace-ability of drugs;

c) Remote writing (White-boarding) on PC or TV d) Image conversion of handwriting Another biometric that is recommended in the identity verification system of the present invention 10 involves cell capture while the pen is being used. The advantage of this biometric over fingerprints is that accuracy is not dependent upon the size of the sensor or print that is captured.

GeneTrace Systems is currently marketing technology involving a new high-resolution mass spectrometry-based method for chemical analysis of large single-stranded DNA oligomers. The mass spectra are obtained in seconds instead of the usual hours needed for gel electrophoresis currently used, and no radioactive or fluorescent materials are needed. The technique has high mass capabilities and opens new avenues of study as in chemical modifications of DNA, DNA-peptide/protein interactions such as antisense drug development. DNA sequencing and quality control for synthetic DNA and related products are also potential applications. The basic technology can be applied also to peptides and proteins and used for protein structure determination, phosphorylation, glycosylation, and other studies. Previously it had not been possible to apply mass spectrometry successfully to anything larger than about a 4-mer and thereby obtain the advantages the mass spectrometry technique can offer in precise and accurate molecular weight determination. The new physico-chemical sample preparation opens this capability to single-stranded DNA molecules above 50,000 Dalton, with a mass accuracy of 0.01% in the 10,000 Dalton range. This is much higher accuracy and resolution than is obtainable with state-of-the-art electrophoresis techniques.

Another approach is to use surface-confined arrays of highly selective sensing elements. Chemical and biological sensors are required to perform multi-analyte measurements rapidly, accurately, and at increasingly lower cost. Arrays of immobilized single-stranded DNA (ssDNA) probes, so-called DNA chips, are being used for genetic analysis for disease detection, toxicology, forensics, industrial processing, and environmental monitoring.

The identity verification system of the present invention 10 is a next generation pen based tool. It enables the most widely used Microsoft Windows based word processing application to be used as a workflow automation system by empowering documents with an electronic signature— attaching signatures to Microsoft Word documents with any pen device The identity verification system of the present invention 10 enables a user to bind an electronic signature to a Word document. The identity verification system of the present invention 10 is compatible with Windows based word processing application to be used as a workflow automation system by empowering documents with an electronic signature. The increasing use of electronic data transmission makes the identity verification system of the present invention 10 a necessary product. Individuals frequently need to print documents to have them signed and then are required to fax them, scan them for storage or keep extensive hard copy archives.

The identity verification system of the present invention 10 is for use with standard business forms such as purchase orders, timecards, expense reports, and personel evaluations. The identity verification system of the present invention 10 enables the author of a form to insert multiple signature blocks and specify who is to sign each signature block and why they are signing. The name of each designated signee is inserted into the appropriate signature block.

The principles of the present invention are also applicable to (1) multi-purpose pens; and (2) classic pens with ink cartridges. As pen and pencil applications grow, many will want to carry one stylus-implement that can be a pen and/or a pencil, that is compatible with pen-based computers, and can be used at POS terminals and other similar sites where financial transactions occur. By including a fingerprint sensor and an encrypted print within the conventional pen, the pen becomes the exclusive property of the one or more individuals who have their prints encrypted within the pen.

Throughout this application, various U.S. Patents, Applications, PCT Applications, and Provisional Applications are referenced by patent application number or title and inventor. The disclosures of these Patents/Applications in their entireties are hereby incorporated by reference into this specification in order to more fully describe the state of the art to which this technology pertains.

It is evident that many alternatives, modifications, and variations of the identity verification system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

What is claimed is:

1. An identity verification device for use with a computer-based system, the system being used in connection with an image that is generated on a reference surface by a user, the identity verification device comprising:

a stylus including a tip operative to generate the image when contacting the reference surface, the stylus further including a fingerprint sensor operative to capture at least one fingerprint image of the user, a memory containing a first reference fingerprint image and a second reference fingerprint image, and a processor in electrical communication with the fingerprint sensor of the stylus and the memory, the processor generating a first identity verification signal responsive to a comparison of a first captured fingerprint image and the first reference fingerprint image, wherein the processor receives an instruction from the system to generate a second identity verification signal, the second identity verification signal being responsive to a comparison of a second captured fingerprint image and the second reference fingerprint image, a second fingerprint image sensor on the stylus in electrical communication with the processor, wherein the second fingerprint image sensor is positioned to capture a second fingerprint image during capture of the first fingerprint image by the first fingerprint sensor, and wherein the processor generates the identity verification signal based at least in part by comparing the second fingerprint image and a second reference fingerprint image.

2. The identity verification device of claim 1, wherein the identity verification device includes a touch-sensitive screen in electrical communication with the processor, and wherein the tip of the stylus is operative to generate the image on the touch-sensitive screen.

3. The identity verification device of claim 1, further comprising a metric sensor on the stylus in electrical communication with the processor, the metric sensor generating an output representing a metric property of the user, and wherein the processor generates the identity verification signal based at least in part using the output of the metric sensor.

4. The identity verification device of claim 1, wherein the stylus includes a wireless transmitter for transmitting the first fingerprint image, and wherein the pen-based computer includes a wireless receiver, in electrical communication with the processor, for receiving the transmitted first fingerprint image.

5. The identity verification device of claim 1, wherein the first finger fingerprint sensor is operative to capture the first fingerprint image without reference to contact between the tip of the stylus and the touch-sensitive screen of the pen-based computer.

6. The identity verification device of claim 1, wherein the memory simultaneously stores a plurality of reference fingerprint images corresponding to a plurality of discrete users.

7. The identity verification device of claim 1, wherein the first finger fingerprint sensor is operative to capture the first fingerprint image without reference to contact between the tip of the stylus and the flat surface.

8. The identity verification device of claim 1, wherein the memory simultaneously stores a plurality of reference fingerprint images corresponding to a plurality of discrete users.

* * * * *